(12) United States Patent
Okumura et al.

(10) Patent No.: US 10,318,782 B2
(45) Date of Patent: Jun. 11, 2019

(54) IMAGE PROCESSING DEVICE, IMAGE PROCESSING SYSTEM, AND IMAGE PROCESSING METHOD

(71) Applicant: KABUSHIKI KAISHA TOSHIBA, Tokyo (JP)

(72) Inventors: Mayu Okumura, Kanagawa (JP); Tsuyoshi Tasaki, Kanagawa (JP); Tsuyoshi Takatani, Kanagawa (JP); Manabu Nishiyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 77 days.

(21) Appl. No.: 15/251,184

(22) Filed: Aug. 30, 2016

(65) Prior Publication Data

US 2017/0069090 A1   Mar. 9, 2017

(30) Foreign Application Priority Data

Sep. 7, 2015 (JP) ................................ 2015-176100

(51) Int. Cl.
  *G06K 9/00* (2006.01)
  *G06T 3/40* (2006.01)
(52) U.S. Cl.
  CPC ........... *G06K 9/00* (2013.01); *G06K 9/00785* (2013.01); *G06K 9/00805* (2013.01); *G06T 3/4038* (2013.01)
(58) Field of Classification Search
  CPC ....... G06T 2200/08; G06T 2207/10028; G06T 7/70; G06T 7/521; H04N 13/271;
  (Continued)

(56) References Cited

U.S. PATENT DOCUMENTS 8,593,519 B2   11/2013   Tauchi et al.
9,336,436 B1 *  5/2016   Dowdall ................ G08G 1/166
(Continued)

FOREIGN PATENT DOCUMENTS

JP   2008-191988   8/2008
JP   2008-236437   10/2008
(Continued)

OTHER PUBLICATIONS

Watanabe, T. et al., "Co-occurrence Histograms of Oriented Gradients for Human Detection," IPSJ Transactions on Computer Vision and Applications, vol. 2, 2010, pp. 659-667.
(Continued)

*Primary Examiner* — Jingge Wu
(74) *Attorney, Agent, or Firm* — Nixon & Vanderhye, P.C.

(57) ABSTRACT

An image processing device obtains first images capturing a street, on which a target vehicle is running, from a plurality of directions, and position information indicating positions at which the first images are taken, and associates a background object in a second image with a background object in a third image. The second image is an image which the target object is detected from and the third image is an image which is taken by an imaging device having a common imaging range with the second image among imaging devices mounted on the target vehicle. An output image is generated to include the position information indicating a position at which the second image is taken, the image of the detection rectangle which is clipped from the second image and includes the target object and the background object, and the first image of surroundings of the target vehicle.

18 Claims, 20 Drawing Sheets

(58) Field of Classification Search
CPC ............ H04N 5/2226; G06K 9/00201; G06K 2009/3291; G06K 9/00; G06K 9/00785; G06K 9/00805; G06K 9/6201; G06K 9/6227

See application file for complete search history.

(56) References Cited

U.S. PATENT DOCUMENTS

| | | | | |
|---|---|---|---|---|
| 9,563,199 | B1* | 2/2017 | Ferguson | B60W 40/04 |
| 2004/0109060 | A1* | 6/2004 | Ishii | B60R 1/00 |
| | | | | 348/148 |
| 2006/0171563 | A1* | 8/2006 | Takashima | G01C 21/28 |
| | | | | 382/104 |
| 2006/0250279 | A1* | 11/2006 | Taniguchi | G01V 8/10 |
| | | | | 340/933 |
| 2007/0230800 | A1* | 10/2007 | Miyahara | G06K 9/00798 |
| | | | | 382/224 |
| 2011/0246027 | A1* | 10/2011 | Miyajima | G01C 21/3647 |
| | | | | 701/41 |
| 2012/0140073 | A1* | 6/2012 | Ohta | B60R 1/00 |
| | | | | 348/148 |
| 2014/0063197 | A1 | 3/2014 | Yamamoto et al. | |
| 2015/0145997 | A1* | 5/2015 | Terashima | G06K 9/00791 |
| | | | | 348/148 |
| 2015/0153735 | A1* | 6/2015 | Clarke | B60W 30/00 |
| | | | | 701/301 |
| 2015/0234045 | A1* | 8/2015 | Rosenblum | G01S 13/931 |
| | | | | 342/71 |
| 2016/0189392 | A1* | 6/2016 | Tsuji | G06K 9/6201 |
| | | | | 382/103 |
| 2016/0342855 | A1* | 11/2016 | Hattori | B60Q 9/008 |

FOREIGN PATENT DOCUMENTS

| | | |
|---|---|---|
| JP | 5418661 | 11/2013 |
| JP | 5516998 | 4/2014 |
| JP | 2014-129093 | 7/2014 |

OTHER PUBLICATIONS

"Additional learning type object recognition system by co-occurrence feature and the vicinity of k method," MIRU, 2011, and English-language machine translation, 6 pgs.

* cited by examiner

IMAGE PROCESSING DEVICE, IMAGE PROCESSING SYSTEM, AND IMAGE PROCESSING METHOD

CROSS-REFERENCE TO RELATED APPLICATIONS

This application is based upon and claims the benefit of priority from Japanese Patent Application No. 2015-176100, filed on Sep. 7, 2015; the entire contents of which are incorporated herein by reference.

FIELD

Embodiments described herein relate generally to an image processing device, an image processing system, and an image processing method.

BACKGROUND

A technology is known in which an overhead view image of the surroundings of a vehicle being driven is created and displayed with the aim of displaying, in an easy-to-understand manner, the pedestrians or the bicycles present behind distant obstacles such as other vehicles or buildings and supporting safe driving of the target vehicle. For example, overhead view images of the surroundings of the target vehicle are created using images taken by an in-vehicle camera mounted on the target vehicle, using images taken by in-vehicle cameras mounted on other vehicles, and using images taken by on-street imaging devices. As a result, the distant obstacles can be displayed with a high degree of accuracy.

In the conventional technology, an overhead view image is generated by deforming various images in tune with the shape of the overhead view image. For that reason, by looking at a wide-area overhead view image created according to the conventional technology, it is difficult for a driver to instantly recognize the presence and the positions of obstacles (pedestrians or bicycles) having a complex shape due to deformation.

DETAILED DESCRIPTION

Figure 1:
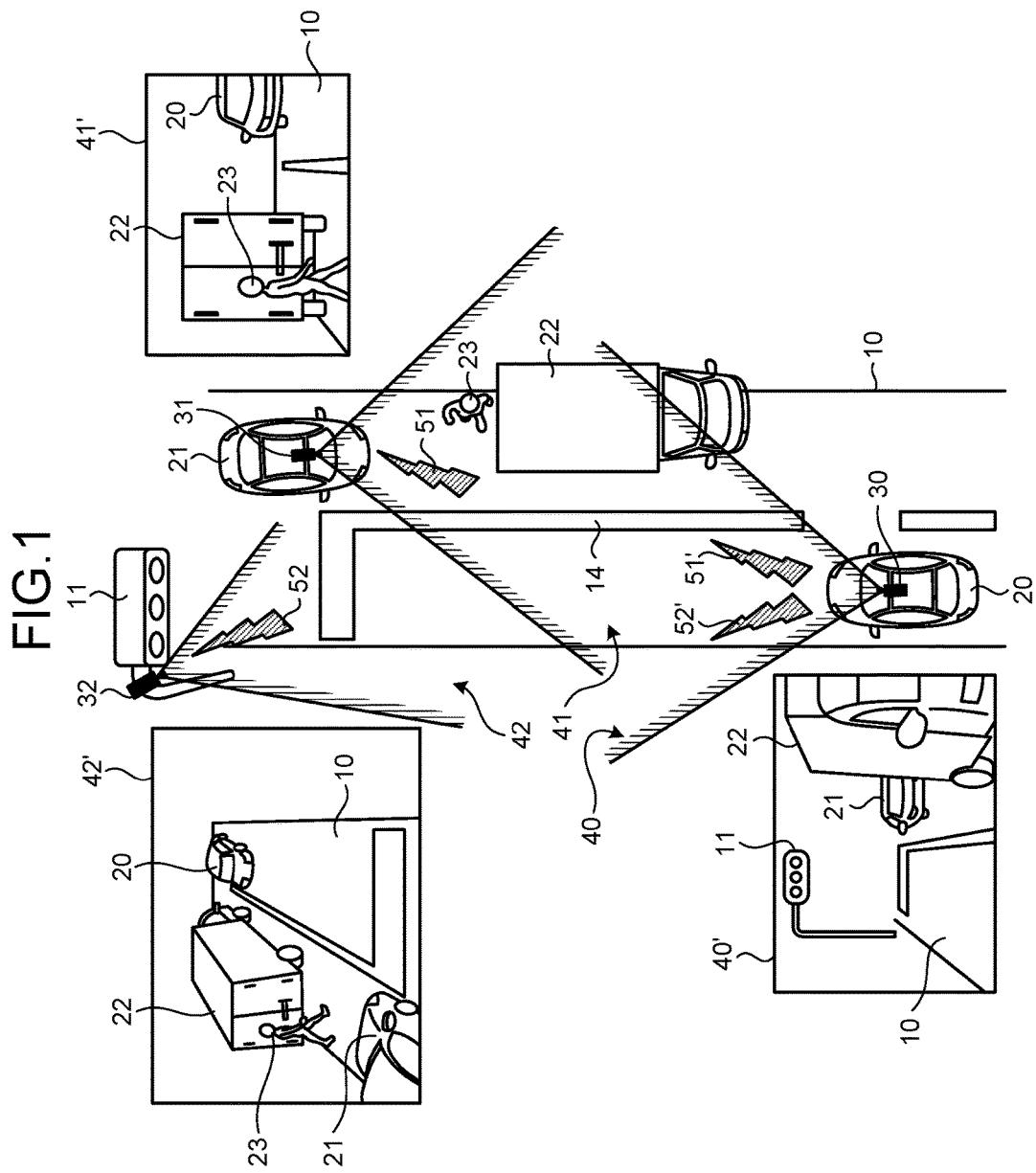
FIG. 1 is a diagram of an image processing system according to embodiments.

Exemplary embodiments of an image processing device, an image processing system, and an image processing method according to the invention are described below with reference to the accompanying drawings.

Common Configuration Across Embodiments

According to one embodiment, an image processing device obtains first images capturing a street, on which a target vehicle is running, from a plurality of directions, and position information indicating positions at which the first images are taken, and associates a background object in a second image with a background object in a third image. The second image is an image which the target object is detected from and the third image is an image which is taken by an imaging device having a common imaging range with the second image among imaging devices mounted on the target vehicle. An output image is generated to include the position information indicating a position at which the second image is taken, the image of the detection rectangle which is clipped from the second image and includes the target object and the background object, and the first image of surroundings of the target vehicle.

A driving support device, which includes an image processing device according to the embodiments, is mounted on, for example, a vehicle (target vehicle) driven by a driver; and generates a target vehicle surroundings image, in which the surroundings of the target vehicle are captured, using images taken by in-vehicle cameras of other vehicles and images taken by on-street imaging devices.

Moreover, in the driving support device, the image processing device performs a detection operation for detecting targets for detection, such as pedestrians, in the images taken by imaging devices in other vehicles and by imaging devices on the streets. If a target object is detected from a taken image, the image processing device associates background objects, which represent objects other than the target object and which are present in the vicinity of the target object, with background objects captured in an image taken by the in-vehicle camera of the target vehicle. Then, the image processing device clips, from the taken image in which the target object is detected, a rectangle including the detected target object as a whole and a certain area or more having the associated background objects; and obtains a detection rectangle image. Subsequently, the image processing device generates a display image in which the clipped detection rectangle image and the target vehicle surroundings image are positioned.

As a result of presenting, to the driver along with presenting the target vehicle surroundings image, a clipped image capturing the target object and the background objects that are visually recognizable by the driver; even if the displayed images are taken by cameras having a different line of sight than the line of sight of the driver, it becomes possible for the driver to easily recognize the positional relationship with the target object and the surrounding objects.

Explained schematically with reference to FIG. 1 is an image processing system that includes the image processing device according to the embodiments. In the central part in FIG. 1, an exemplary overhead view of a street 10 is illustrated. In the example illustrated in FIG. 1, on the street 10 (assumed to have left-hand traffic), a vehicle 20 is present on the left-hand traffic lane of a center line 14, while vehicles 21 and 22 and a pedestrian 23 are present on the right-hand traffic lane of the center line 14. Thus, the vehicle 20 is travelling in the left-hand traffic lane of the center line 14, and the vehicle 21 is travelling in the right-hand traffic lane of the center line 14. The vehicle 22 is assumed to be parked on the right-hand edge of the right-hand traffic lane. The pedestrian is attempting to cross the street 10 from the right-hand traffic lane toward the left-hand traffic lane. Meanwhile, with reference to FIG. 1, traffic light 11 is installed at the left-hand end of the street 10.

In the vehicle 20, a driving support device 30, which includes the image processing device according to the embodiments, is installed. In the vehicle 21, an imaging device 31 is installed that has an imaging function, a communication function, and a position information obtaining function. To the traffic light 11, an imaging device 32 is fixedly installed that has the imaging function, the communication function, and the position information obtaining function. In the following explanation, the vehicle 20 equipped with the driving support device 30 is referred to as the target vehicle (the target vehicle 20), and the other vehicles 21 and 22 are referred to as other vehicles (the other vehicle 21 and the other vehicle 22).

In the target vehicle 20, the driving support device 30 has the imaging function. In FIG. 1, the imaging range of the imaging function of the driving support device 30 is illustrated as an imaging range 40. Moreover, in FIG. 1, the imaging range of the imaging device 31 mounted on the vehicle 21 is illustrated as an imaging range 41, and the imaging range of the imaging device 32 mounted on the traffic light 11 is illustrated as an imaging range 42.

In the bottom left part of FIG. 1, an exemplary taken image 40' is illustrated that is taken using the imaging function of the driving support device 30 mounted on the target vehicle 20. In an identical manner, in the top right part of FIG. 1, an exemplary taken image 41' is illustrated that is taken by the imaging device 31 mounted on the other vehicle 21. Moreover, in the top left part of FIG. 1, an exemplary taken image 42' is illustrated that is taken by the imaging device 32 mounted on the traffic light 11.

In the taken image 40', in a corresponding manner to the imaging range 40, images of the street 10 and the traffic light 11 are included along with images of the other vehicles 21 and 22. The taken image 40' corresponds to the scene that is visible from the target vehicle 20 in the direction of travel. In an identical manner, in the taken image 41', in a corresponding manner to the imaging range 41, an image of the street 10 is included; images of the target vehicle 20 and the other vehicle 22 are included; and an image of the pedestrian 23 is included. Moreover, in the taken image 42', in a corresponding manner to the imaging range 42, an image of the street 10 is included; images of the target vehicle 20 and the other vehicles 21 and 22 are included; and an image of the pedestrian 23 is included.

Herein, an image of the pedestrian 23 is included in the taken images 41' and 42'. However, when seen from the target vehicle 20, the pedestrian 23 is behind the other vehicle 22. Hence, an image of the pedestrian 23 is not included in the taken image 40'. For that reason, even if the driver of the target vehicle 20 looks at the taken image 40' that is taken using the imaging function of the driving support device 30 mounted on the target vehicle 20, he or she cannot recognize the presence of the pedestrian 23. Therefore, in case the pedestrian 23 unexpectedly dashes out from behind the other vehicle 22 that is parked, the driver of the target vehicle 20 may not be able to handle the situation.

In that regard, in the embodiments, the imaging devices 31 and 32, which have taken the taken images 41' and 42', respectively, in the imaging ranges 41 and 42, respectively, having different directions than the imaging range of the target vehicle 20, send the taken images 41' and 42', respectively, using wireless communication 51 and 52, respectively. The driving support device 30, which is mounted on the target vehicle 20, receives (using wireless communication 51' and 52', respectively) the taken images 41' and 42' that are sent using the wireless communication 51 and 52, respectively.

Based on the taken image 40' taken using the imaging function of the driving support device 30 and based on the taken image 41' and 42' received using the wireless communication 51' and 52', respectively; the driving support device 30 generates a detection rectangle image including the image of the pedestrian 23 and the image of the other vehicle 22 also visible from the target vehicle 20 as well as generates a target vehicle surroundings image that enables understanding of the positional relationship between the target vehicle 20 and the pedestrian 23, and then displays the generated images in a single screen at the same time so as to present them to the driver of the target vehicle 20. As a result, the driver of the target vehicle 20 can easily understand that the pedestrian 23 is present behind the other vehicle 22, and can be ready to handle the situation in case the pedestrian 23 unexpectedly dashes out from behind the other vehicle 22.

First Embodiment

Figure 2:
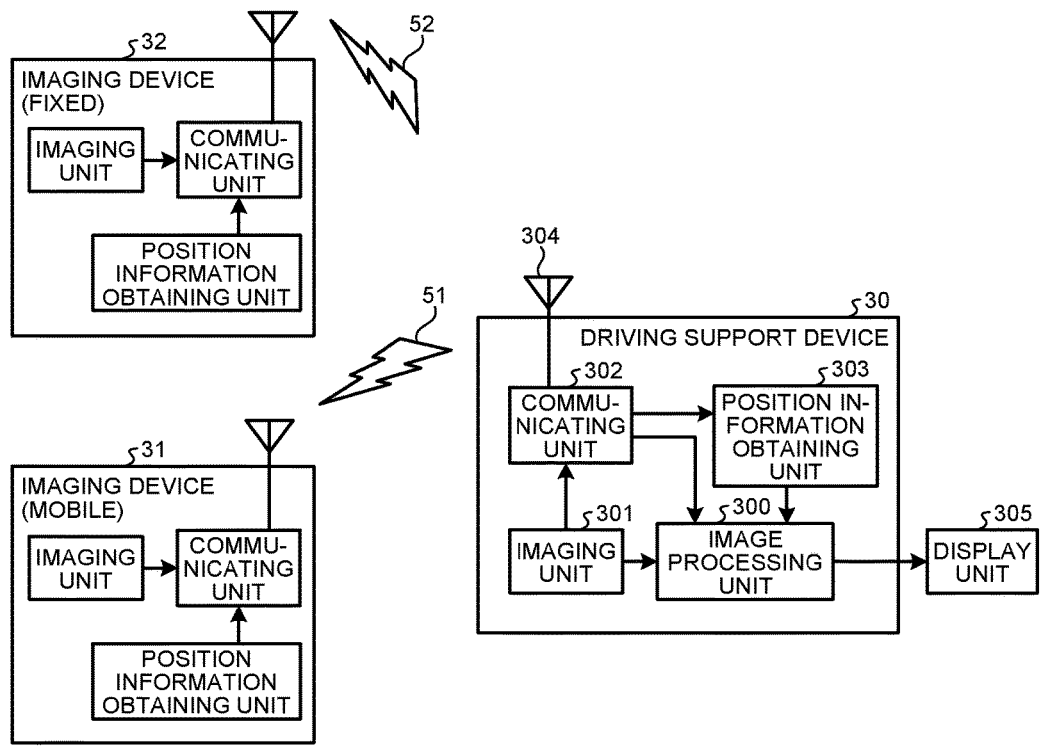
FIG. 2 is a block diagram that schematically illustrates an exemplary configuration of an image processing system in which an image processing device is used.

Given below is the explanation of an image processing device according to a first embodiment. In FIG. 2 is schematically illustrated an exemplary configuration of an image processing system in which the image processing device according to the first embodiment is used. In FIG. 2, the driving support device 30 is mounted on the target vehicle 20 as explained with reference to FIG. 1. The driving support device 30 includes an image processing unit 300 as the image processing device according to the first embodiment as well as includes an imaging unit 301, a communicating unit 302, and a position information obtaining unit 303.

The imaging unit 301 captures, for example, the side in the direction of travel of the target vehicle 20 as the imaging range 40, and outputs the taken image 40'. The communicating unit 302 performs wireless communication via an antenna 304. The position information obtaining unit 303 obtains position information indicating the current position.

The image processing unit 300 receives input of the taken image output from the imaging unit 301, the taken image received by the communicating unit 302, and the position information obtained by the position information obtaining unit 303. Based on the taken images that are input thereto, the image processing unit 300 generates a target vehicle surroundings image in which the surroundings of the target vehicle 20 are captured as well as generates a detection rectangle image by detecting the target object (for example, a person) and background objects, and displays the generated images along with the position information on a display unit 305 and presents them to the driver.

The imaging device 31 is installed, for example, in a moving vehicle such as the other vehicle 21 and, for example, includes an imaging unit for capturing the side in the direction of travel of the other vehicle 21; a position information obtaining unit for obtaining the current position; and a communicating unit that sends taken images and position information using the wireless communication 51. The imaging device 32 is installed, for example, in a fixed object such as the traffic light 11 and includes an imaging unit, a position information obtaining unit, and a communicating unit in an identical manner to the constituent elements of the imaging device 31. Thus, in the imaging device 32, the communicating unit sends the taken image, which is output by the imaging unit, and the position information, which is obtained by the position information obtaining unit, using the wireless communication 52. Moreover, in the imaging device 32, the imaging direction of the imaging unit is set in advance.

In the first embodiment, the communicating unit 302 of the driving support device 30 performs direct communication with the communicating units of the imaging devices 31 and 32 using the wireless communication 51 and the wireless communication 52, respectively. For example, the communicating unit 302 searches for the communicating units of the imaging devices 31 and 32; and establishes communication with the communicating units when found. At that time, the communicating unit 302 can be configured to perform communication with all communicating units that are found. Alternatively, the communicating unit 302 can request all communicating units for position information and, based on the position information sent by the communicating units in response to the request, filters the communicating unit with which communication is to be performed.

As far as the communication method implementable in the first embodiment is concerned, there is no particular restriction as long as peer-to-peer (P2P) communication is possible. Thus, it is possible to use Wi-Fi (registered trademark), which is one type of a wireless local area network (LAN), or Bluetooth (registered trademark). Meanwhile, communication between mobile objects, such as communication between the target vehicle 20 and the other vehicle 21, is called inter-mobile-object communication; while communication between a mobile object and a fixed object placed near the street 10, such as communication between the traffic light 11 and the target vehicle 20, is called to-fixed-object communication.

In the example illustrated in FIG. 2, the image processing system includes a single imaging device 31 and a single imaging device 32. However, that explanation is only exemplary, and it is not the only possible case. That is, the image processing system can include two or more imaging devices 31 and two or more imaging devices 32. Moreover, in the example illustrated in FIG. 2, the driving support device 30 is installed only in the target vehicle 20. However, that is not the only possible case. That is, the driving support device 30 can be mounted on a plurality of vehicles. In that case, in an identical manner to the imaging devices 31 and 32, each driving support device 30 can be configured to send, using the communicating unit 302, the taken image output by the imaging unit 301 and the position information obtained by the position information obtaining unit 303.

Figure 3:
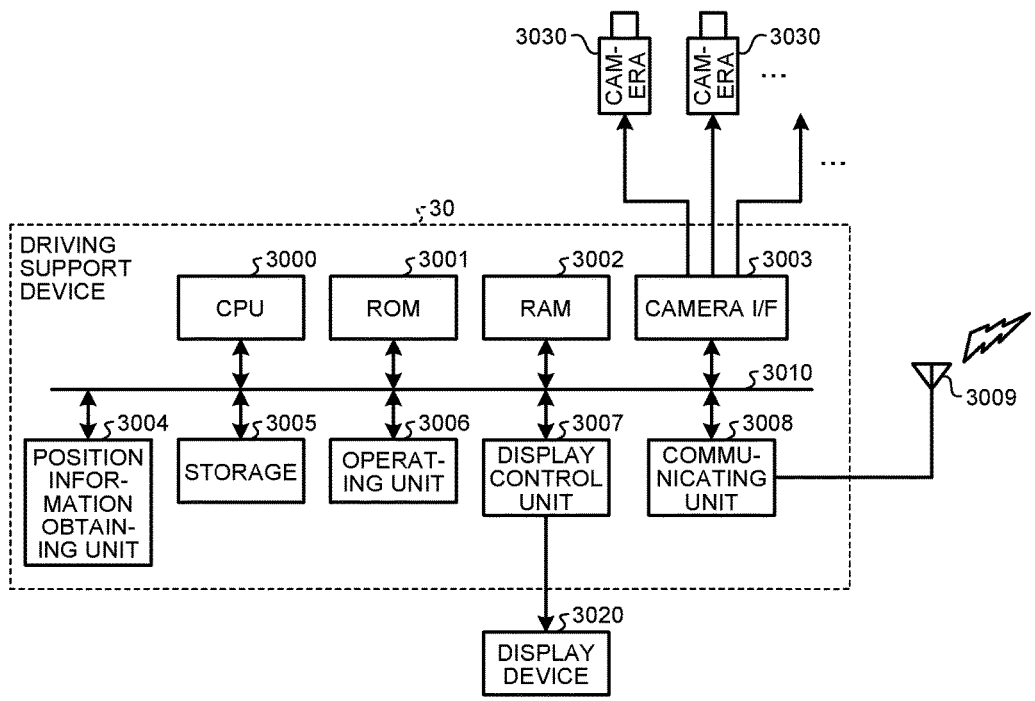
FIG. 3 is a block diagram illustrating an exemplary configuration of a driving support device.

In FIG. 3 is illustrated an exemplary configuration of the driving support device 30 that can be implemented in the first embodiment. In FIG. 3, the driving support device 30 includes a central processing unit (CPU) 3000, a read only memory (ROM) 3001, a random access memory (RAM) 3002, a camera interface (I/F) 3003, a position information obtaining unit 3004, a storage 3005, an operating unit 3006, a display control unit 3007, and a communicating unit 3008. Moreover, all the constituent elements are connected to each other in a communicable manner by a bus 3010.

The storage 3005 is a memory medium used to store data in a nonvolatile manner. A flash memory or a hard disk drive can be used as the storage 3005. The CPU 3000 follows computer programs that are stored in advance in the storage 3005 or the ROM 3001, uses the RAM 3002 as the work area, and controls the operations of the driving support device 30.

The camera I/F 3003 is an interface for connecting cameras 3030 to the driving support device 30. Thus, it becomes possible to connect to a plurality of cameras 3030. The imaging unit 301 illustrated in FIG. 2 corresponds to the configuration including, for example, the cameras 3030 and the camera I/F 3003. The CPU 3000 can control the imaging operation of the cameras 3030 via the camera I/F 3003.

The position information obtaining unit 3004 corresponds to the position information obtaining unit 303 illustrated in FIG. 2, and obtains information indicating the current position using, for example, the global navigation satellite system (GNSS). However, that is not the only possible case. Alternatively, the position information obtaining unit 3004 can obtain the current position using an inertial measurement unit (IMU), or can obtain the current position using a combination of GNSS and IMU. Still alternatively, the position information obtaining unit 3004 can calculate the current position based on the velocity and the steering angle of the target vehicle 20.

The operating unit 3006 receives user operations from an operator console or a touch-sensitive panel. The display control unit 3007 converts display data, which is generated by the CPU 3000 according to computer programs, into display control signals capable of driving a display device 3020 and outputs the display control signals. The display device 3020 has, for example, a liquid crystal display (LCD) and displays screens corresponding to the display control signals provided from the display control unit 3007.

The communicating unit 3008 performs wireless communication via an antenna 3009 under the control of the CPU 3000. As far as the communication method implementable in the communicating unit 3008 is concerned, it is possible to use Wi-Fi (registered trademark) or Bluetooth (registered trademark).

Figure 4:
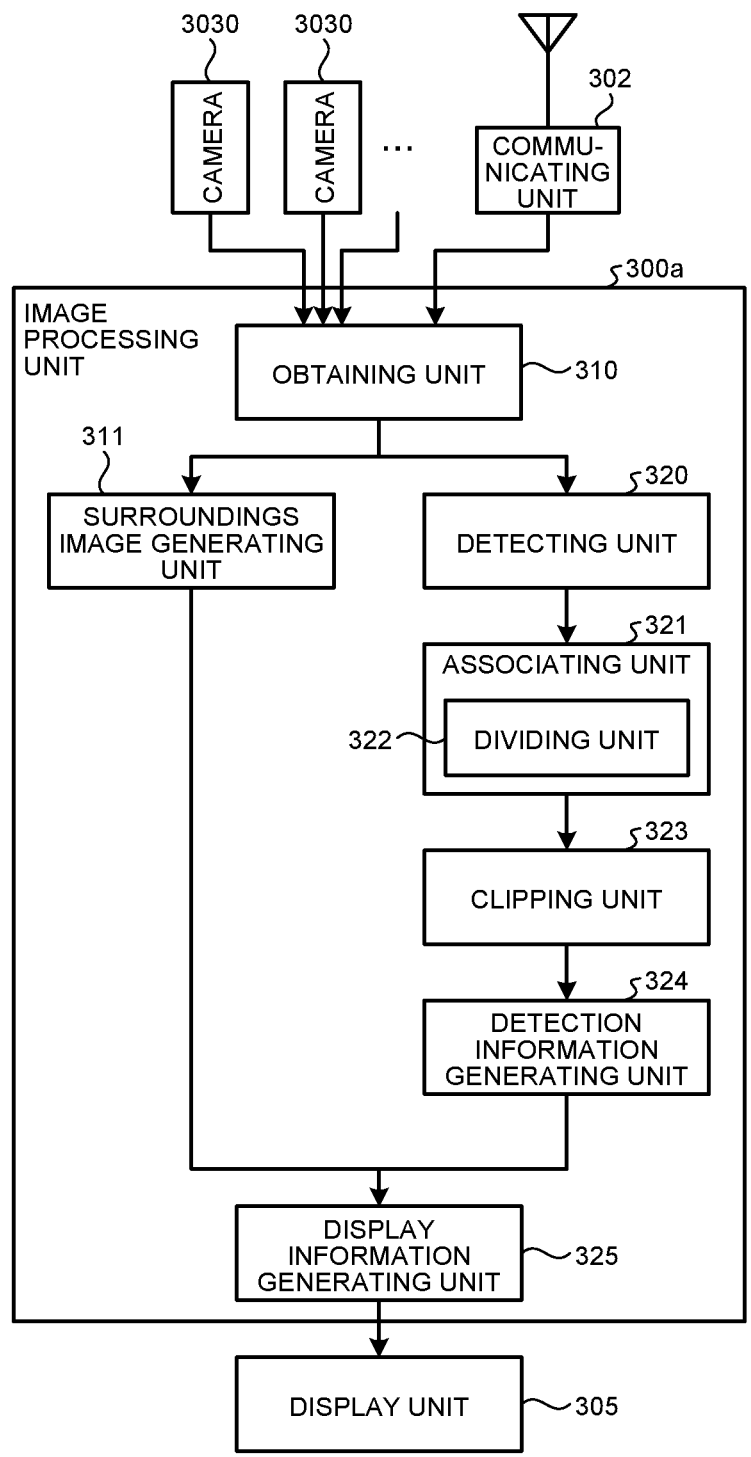
FIG. 4 is a functional block diagram for explaining the functions of an image processing unit.

FIG. 4 is a functional block diagram for explaining the functions of the image processing unit according to the first embodiment. In FIG. 4, an image processing unit 300a corresponds to the image processing unit 300 explained with reference to FIG. 2, and includes an obtaining unit 310, a surroundings image generating unit 311, a detecting unit 320, an associating unit 321, a clipping unit 323, a detection information generating unit 324, and a display information generating unit 325. Moreover, the associating unit 321 further includes a dividing unit 322.

The obtaining unit 310, the surroundings image generating unit 311, the detecting unit 320, the associating unit 321, the dividing unit 322, the clipping unit 323, the detection information generating unit 324, and the display information generating unit 325 can be implemented by making the CPU 3000 to execute computer programs. However, that is not the only possible case. Alternatively, some or all of the obtaining unit 310, the surroundings image generating unit 311, the detecting unit 320, the associating unit 321, the dividing unit 322, the clipping unit 323, the detection information generating unit 324, and the display information generating unit 325 can be implemented using hardware such as individual integrated circuits that operate in tandem with each other.

The obtaining unit 310 obtains taken images in which the street 10, on which the target vehicle 20 is running, is captured from a plurality of different directions; and obtains position information indicating the imaging positions. More particularly, the obtaining unit 310 obtains the taken images and the position information sent by the imaging devices 31 and 32. Moreover, the obtaining unit 310 can also obtain the taken images that are taken by the cameras 3030 connected to the driving support device 30 and the position information from the position information obtaining unit 303.

The surroundings image generating unit 311 generates, based on the taken images (first images) and the position information obtained by the obtaining unit 310, an image of the surroundings of the target vehicle 20 as a target vehicle surroundings image for the target vehicle 20. Then, the surroundings image generating unit 311 sends the target vehicle surroundings image to the display information generating unit 325.

The detecting unit 320 detects an image of the target object, such as a pedestrian, from the taken images which are obtained by the obtaining unit 310 and in which the street being travelled is captured from a plurality of different directions.

The associating unit 321 associates a detection target capturing image (a second image), which is that image from among the taken images obtained by the obtaining unit 310 in which the detecting unit 320 detects the target object, with a common-range taken image (a third image), which is the taken image taken by that camera 3030 from among the cameras 3030 mounted on the target vehicle 20 which has the common imaging range to the detection target capturing image. More particularly, the associating unit 321 associates background objects, which represent objects other than the target object in the detection target capturing image and which are present within a certain area from the target object, with objects captured in the common-range taken image.

The associating unit 321 includes the dividing unit 322 that divides the detection target capturing image as well as the common-range taken image into areas based on color information and edge information. Then, the associating unit 321 compares the areas, which are generated by division by the dividing unit 322, between the detection target capturing image and the common-range taken image; and associates the divided areas.

The clipping unit 323 clips, from the detection target capturing image, a detection rectangle image that is a rectangle image which includes an area of a certain percentage of the smallest rectangle including the entire target object detected by the detecting unit 320 and the background objects associated by the associating unit 321.

When a detection rectangle image including the target object is clipped by the clipping unit 323, the detection information generating unit 324 generates detection information that contains position information indicating the imaging position of the detection target capturing image and contains the detection rectangle image that is clipped. Herein, the detection information generating unit 324 can obtain the position information from the obtaining unit 310. Then, the detection information generating unit 324 sends the generated detection information to the display information generating unit 325.

The display information generating unit 325 generates, for example, display information for the purpose of presenting the target vehicle surroundings image sent by the surroundings image generating unit 311, and presenting the detection rectangle image and the position information included in the detection information sent by the detection information generating unit 324. More particularly, the display information generating unit 325 generates display information in which the target vehicle surroundings image, the detection rectangle image, and the position information are placed in a single screen.

Figure 5:
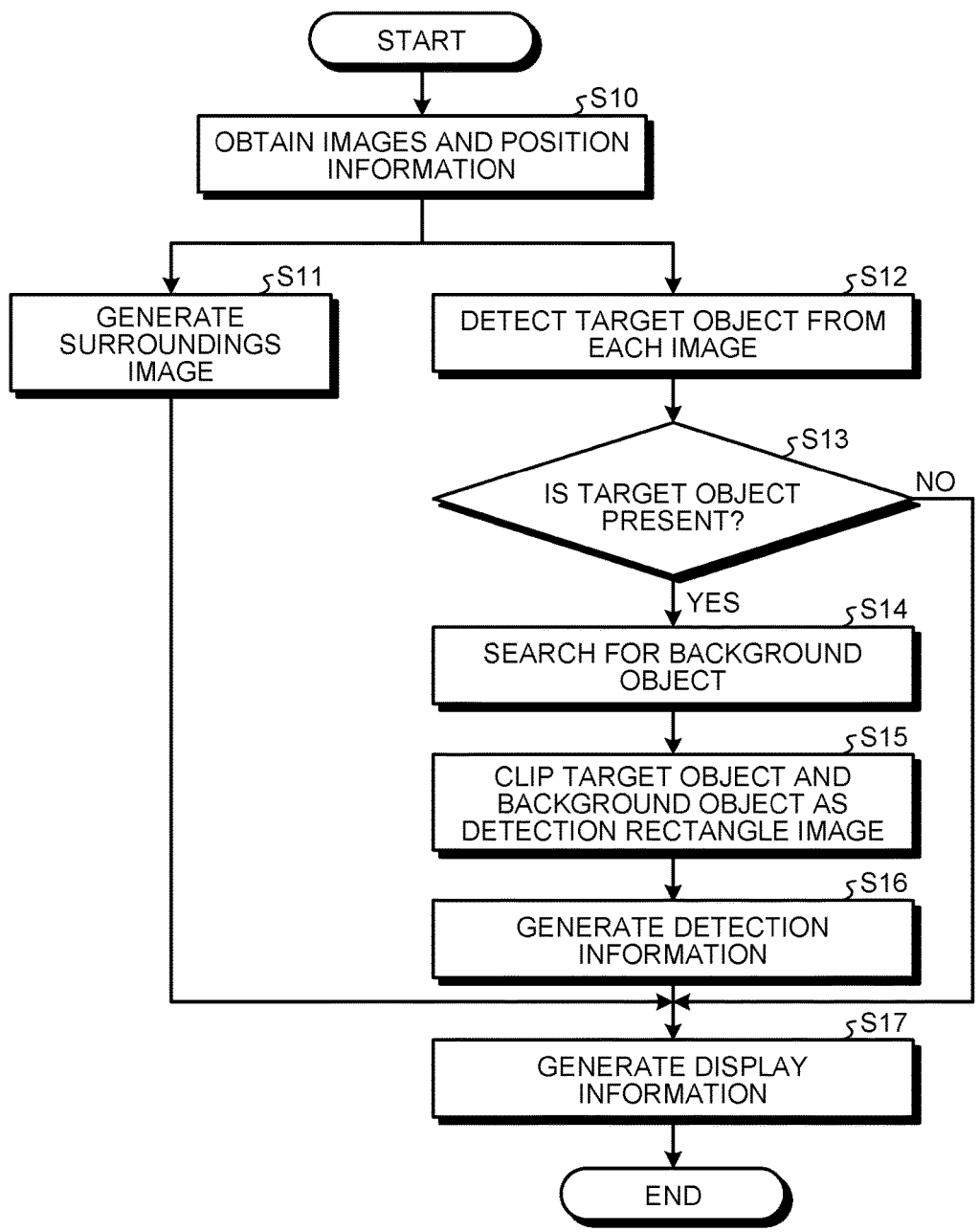
FIG. 5 is an exemplary flowchart for explaining the operations performed in the image processing unit.

FIG. 5 is an exemplary flowchart for explaining the operations performed in the image processing unit 300a according to the first embodiment. At Step S10, in the image processing unit 300a, the obtaining unit 310 obtains taken images in which the street 10, on which the target vehicle 20 is running, is captured from a plurality of different directions, and obtains the position information indicating the imaging positions.

The next operation at Step S11 and the operations at Steps S12 to S15 can be performed in parallel. However, that is not the only possible case. Alternatively, the operation at Step S11 can be performed at any arbitrary point in between the operations performed at Steps S12 to S15. At Step S11, in the image processing unit 300a, the surroundings image generating unit 311 generates, based on the taken images and the position information obtained by the obtaining unit 310 at Step S10, an image of the surroundings of the target vehicle 20 as the target vehicle surroundings image for the target vehicle 20.

At Step S12, in the image processing unit 300a, the detecting unit 320 detects, from the taken images obtained by the obtaining unit 310 at Step S10, an image in which the target object such as a pedestrian is captured. Then, at Step S13, in the image processing unit 300a, based on the detection result obtained at Step S12, it is determined whether or not the image of the target object is present in each taken image.

If it is determined at Step S13 that the image of the target object is not present, then the system control proceeds to Step S17.

On the other hand, at Step S13, if it is determined by the image processing unit 300a that the target object is present, that is, the detection target capturing image including the image of the target object is present in each taken image obtained at Step S10, the system control proceeds to Step S14.

At Step S14, in the image processing unit 300a, the associating unit 321 associates background objects between the detection target capturing image obtained at Step S12 and a common-range taken image, which is the taken image obtained at Step S10 and taken by the camera 3030 having the common imaging range to the detection target capturing image from among the cameras 3030 mounted on the target vehicle 20.

At Step S15, in the image processing unit 300a, the clipping unit 323 clips, from the detection target capturing image, a detection rectangle image that is a rectangle image which includes an area of a certain percentage of the smallest rectangle including the entire target object detected at Step S12 and the background objects associated at Step S14. Then, at Step S16, in the image processing unit 300a, when a detection rectangle image is clipped at Step S15, the detection information generating unit 324 generates detection information that contains position information indicating the imaging position of the detection target capturing image in which the target object is detected, and contains the detection rectangle image that is clipped.

Subsequently, at Step S17, in the image processing unit 300a, the display information generating unit 325 generates display information for the purpose of presenting to the user the target vehicle surroundings image, which is generated by the surroundings image generating unit 311 at Step S16, and the detection information generated at Step S16. Then, the display device 3020 displays the generated display information under the control of the display control unit 3007. Meanwhile, when the system control proceeds to Step S17 as a result of determination at Step S13 that the image of the target object is not present in the taken images, it is possible to think of a case of generating display information containing only the target vehicle surroundings image generated at Step S11.

Given below is the detailed explanation of each operation in the flowchart illustrated in FIG. 5. In the following explanation, the target object is assumed to be a person. However, the target object is not limited to a person, and alternatively can be, for example, an automobile, a bicycle, a motorcycle, or an animal such as a dog or a cat.

The following explanation is given about the operation performed at Step S10 illustrated in FIG. 5 for obtaining the taken images and the position information. At Step S10, the obtaining unit 310 obtains the taken images that are taken by the imaging device 31, which is mounted on the other vehicle 21, and by the imaging device 32, which is mounted on the vicinity of the street 10, and that capture the street 10, on which the target vehicle 20 is running, from a plurality of different directions; and obtains the position information indicating the imaging positions. Moreover, the obtaining unit 310 further obtains the taken images that are taken by the cameras 3030 mounted on the target vehicle 20, and obtains the position information obtained by the position information obtaining unit 303.

Figure 6A:
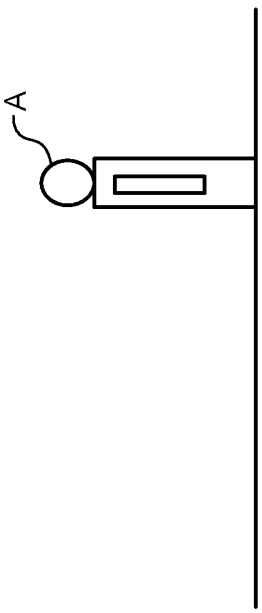
FIGS. 6A to 6C are diagrams illustrating examples of having a common imaging range.
Figure 6B:
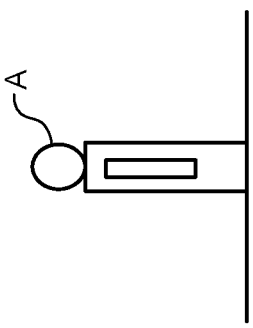
Figure 6C:

Generally, the taken images obtained by the obtaining unit 310 are assumed to be taken using cameras that perform imaging in visible light. However, that is not the only possible case, and the obtaining unit 310 can obtain the taken images that are taken using infrared cameras capable of performing imaging in the dark. Moreover, the imaging direction of the imaging devices 31 and 32 are not particularly restricted, and the imaging devices 31 and 32 can perform imaging in mutually different directions. On the other hand, the imaging devices 31 and 32 need to have a common imaging range with one or more cameras 3030 from among the cameras 3030 mounted on the target vehicle 20. For example, as illustrated in FIG. 6A and FIG. 6B, with respect to the same detection target A, the camera 3030 can perform imaging from the front, the imaging device 31 can perform imaging from a lateral view, and the imaging device 32 can perform imaging from behind.

The following explanation is given about the operation performed at Step S11 illustrated in FIG. 5 for generating a target vehicle surroundings image. The surroundings image generating unit 311 generates a target vehicle surroundings image using the taken images obtained by the obtaining unit 310 at Step S10. As far as a target vehicle surroundings image is concerned, it is possible to use an overhead view image in which the surroundings of the target vehicle 20 are captured in an overhead view. The generation of an overhead view image using a plurality of taken images, which are taken from mutually different directions and which have at least some common imaging range, can be done by performing homography conversion of each taken image and then synthesizing the taken images.

The position information of each camera (the cameras 3030 and the imaging devices 31 and 32) is obtained by the obtaining unit 310 at Step S10, and is thus already known. If the road surface of the street 10 is assumed to be a flat surface, then it is possible to calculate a relative position t (a translation vector) and an orientation R (a rotation matrix) of each camera with respect to the flat surface of the street 10. If M represents a point on the flat surface of the street 10, if m represents a point on the corresponding image, if A represents an internal parameter matrix of the camera, and if H represents a homography matrix; then Equation (1) given below is established. In Equation (1), H=A[$r_1$ $r_2$ t] holds true.

$$sm=HM \qquad (1)$$

Herein, s represents a scale constant, and $r_1$ and $r_2$ represent a first column vector and a second column vector, respectively, of the rotation matrix R. The translation vector t and the rotation matrix R can be calculated; while the camera internal parameter matrix A is already known as a result of performing calibration of the camera in advance. Hence, the homography matrix H can be calculated with ease. Consequently, the conversion for setting the normal direction of the flat surface of the street as the line of sight can be calculated using Equation (2) given below. With that, an overhead view image can be created based on the taken image of each camera. Herein, m' represents a point in the post-conversion image.

$$m'=H^{-1}m \qquad (2)$$

Then, the overhead view image created for each camera is synthesized so as to create a single overhead view image. For example, a plurality of overhead view images can be synthesized by superimposition based on the position information, or can be synthesized by performing position adjustment using information such as colors, textures, and edges in each overhead view image.

The following explanation is given about the operation performed at Step S12 illustrated in FIG. 5 for detecting the target object. The detecting unit 320 measures the humanness of the target object from the taken images that are obtained by the obtaining unit 310 at Step S10, and that are taken by the imaging device 31, which is mounted on the other vehicle 21, and the imaging device 32, which is mounted on the vicinity of the street 10. Then, the detecting unit 320 performs threshold determination with respect to the measurement result, and determines whether the measurement result is a person or a non-person.

Figure 7:
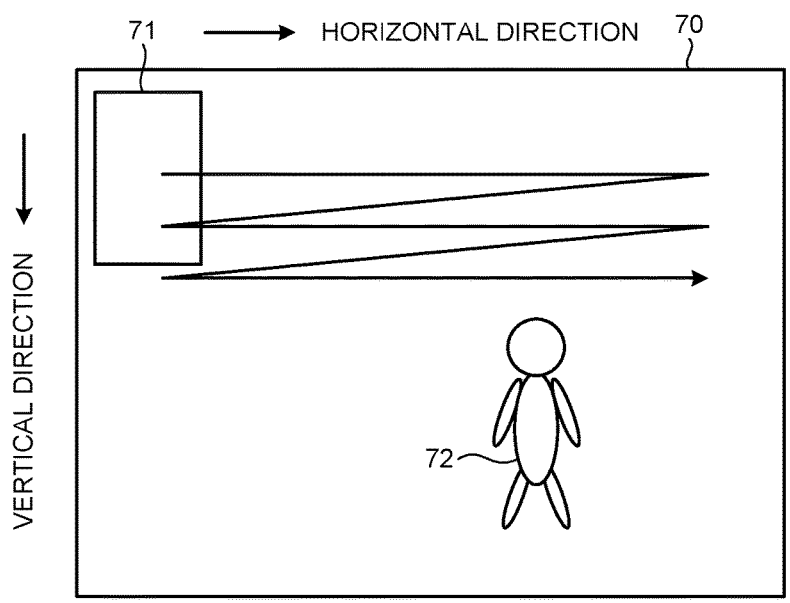
FIG. 7 is a diagram for explaining a detection operation for detecting a target object.

More particularly, as illustrated in FIG. 7, the detecting unit 320 sets a detection window area 71 having a predetermined size with respect to a target image 70 that is the target taken image. Then, while moving the detection window area 71 in, for example, the horizontal direction in predetermined units and the vertical direction in predetermined units within the target image 70, the detecting unit 320 calculates the feature quantity of the image within the detection window area 71 and, based on the calculated feature quantity, determines whether or not an image 72 corresponding to the target object is included in the target image 70.

Figure 8:
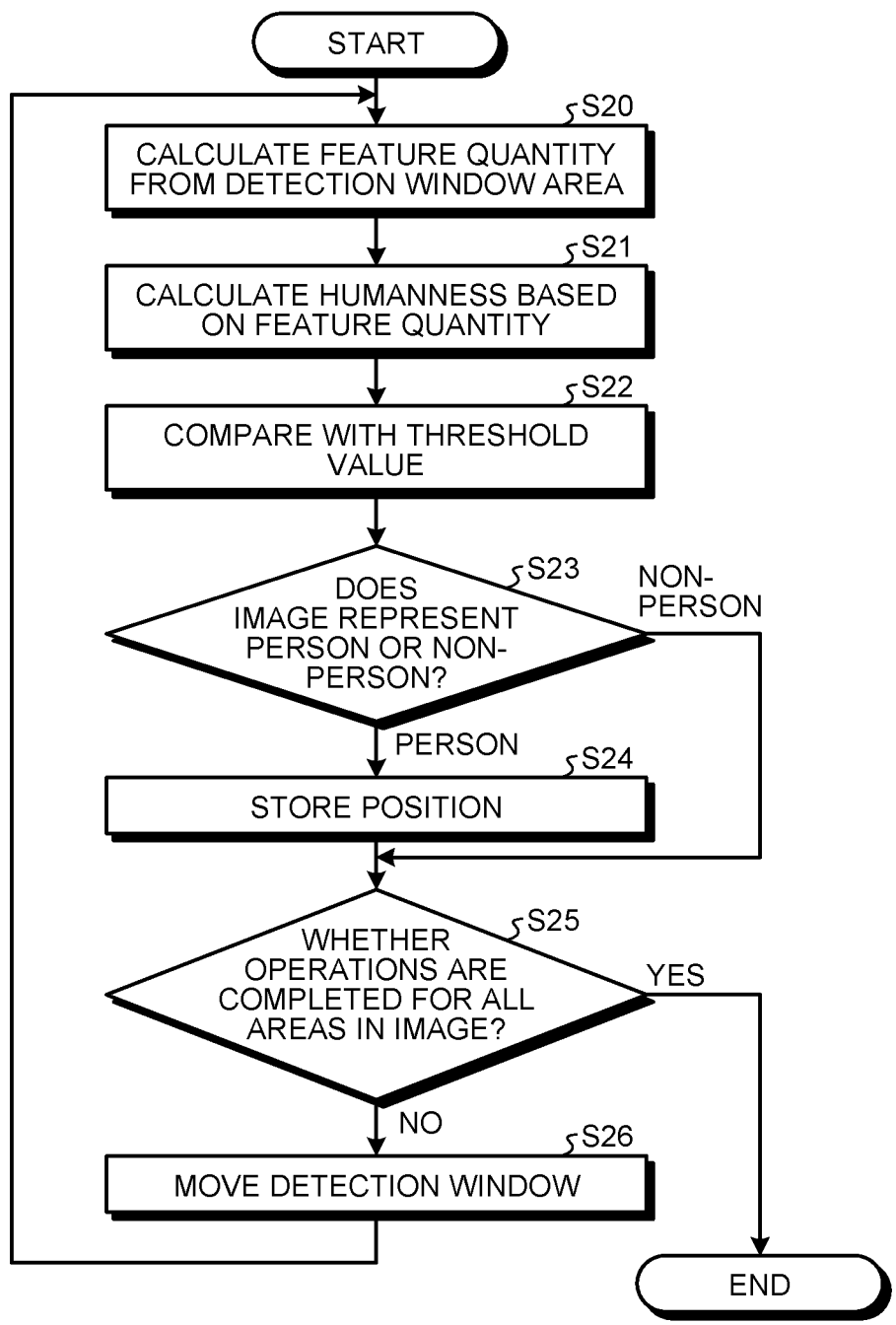
FIG. 8 is a flowchart for explaining an example of the detection operation for detecting a target object.

FIG. 8 is a flowchart for explaining an exemplary detection operation that is performed by the detecting unit 320 for detecting the target object and that can be implemented in the first embodiment. In FIG. 8, at Step S20, the detecting unit 320 calculates the feature quantity from the image inside the detection window area 71. For example, it is possible to think of a case in which the detecting unit 320 calculates, as the feature quantity, the HOG feature quantity (HOG stands for Histograms of Oriented Gradients) obtained by forming histograms of the brightness gradient and the brightness intensity within the detection window area 71.

Then, at Step S21, based on the feature quantity calculated at Step S20, the detecting unit 320 evaluates an evaluation value indicating the humanness using a classifier. As far as the classifier is concerned, it is possible to implement, for example, a support vector machine (SVM) that has been subjected to proper learning according to the HOG feature quantity regarding the target image. As far as the evaluation value is concerned, it is possible to make use of, for example, the distance of the feature quantity, which is calculated at Step S20, with respect to the maximum-margin hyperplane.

Alternatively, as written in Non-patent Literature 1, the feature quantity calculated at Step S20 can be the CoHOG feature quantity (CoHOG stands for co-occurrence HOG) that is obtained by improving the HOG feature quantity in the aspect of identification capacity. That is, at Step S20, the direction of brightness gradient is calculated from an image in the detection window area 71, and the CoHOG feature quantity is calculated from the calculated direction of brightness gradient. Then, using the SVM subjected to proper learning according to the CoHOG feature quantity regarding the target image, the distance of the calculated CoHOG feature quantity with respect to the maximum-margin hyperplane is calculated and is set as the evaluation value.

Subsequently, at Step S22, the detecting unit 320 compares the evaluation value, which is calculated at Step S21, with a threshold value. Then, at Step S23, based on the comparison result obtained at Step S22, the detecting unit 320 determines whether or not the image within the detection window area 71 includes the target object, that is, whether or not the image in the detection window area 71 is a person or not a person (non-person). For example, when the evaluation value exceeds the threshold value, the detecting unit 320 determines that the image in the detection window area 71 represents a person. If the determination result indicates that image in the detection window area 71 represents a non-person, then the system control proceeds to Step S25.

As a result of the determination performed at Step S23, when the image in the detection window area 71 is determined by the detecting unit 320 to be the target object, that is, a person; the system control proceeds to Step S24 and the detecting unit 320 stores the position of the target object in the target image 70 in the RAM 3002. However, that is not the only possible case. Alternatively, the detecting unit 320 can be configured to store the position of formation of the detection window area 71, which is determined to include an image of a person, in the target image. Once the detecting unit 320 stores the position of the target object, the system control proceeds to Step S25.

At Step S25, the detecting unit 320 determines whether or not the operations are completed for all areas in the target taken image 70. If it is determined that the operations are completed, it marks the end of the sequence of operations performed with respect to the taken image 70 as illustrated in the flowchart in FIG. 8. However, at Step S25, if the detecting unit 320 determines that the operations are not completed, then the system control proceeds to Step S26 and the detecting unit 320 moves the detection window area 71 within the target image 70. Then, the system control returns to Step S20, and the operations with respect to the next taken image are started.

The following explanation is given about the operation performed at Step S14 illustrated in FIG. 5 for searching for background objects. In a detection target capturing image in which the detecting unit 320 detects the target object, and in a common-range taken image that is taken by the camera 3030 having at least some common imaging range to the detection target capturing image from among the cameras 3030 mounted on the target vehicle 20; the associating unit 321 associates images capturing background objects, which represent objects other than the target object in the detection target capturing image and which are present within a certain area from the target object, with images capturing objects in the common-range taken image.

Figure 9A:
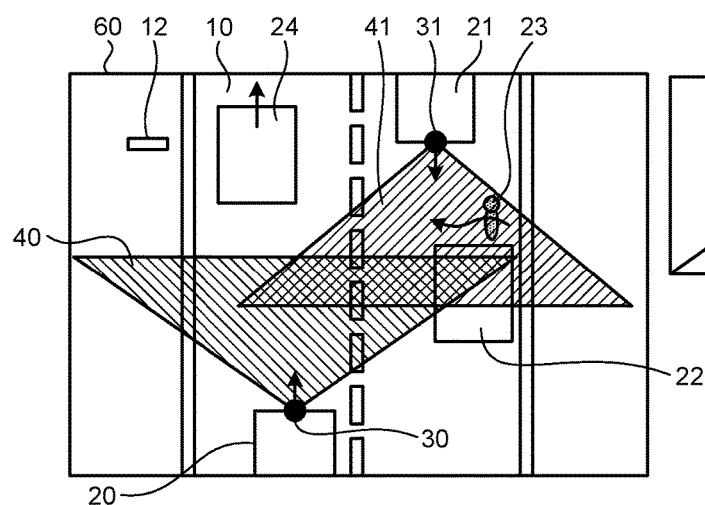
FIGS. 9A to 9C are diagrams for explaining association between taken images, in which a background object is captured.
Figure 9B:
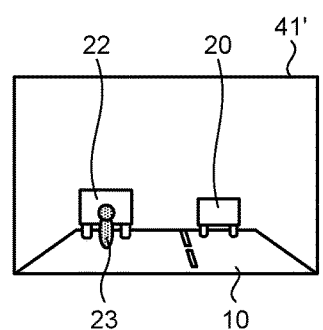
Figure 9C:
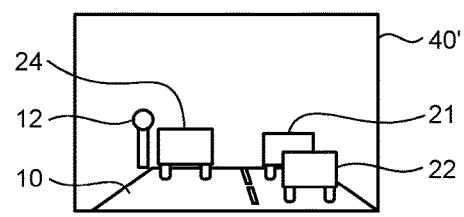

A more specific example is explained with reference to FIGS. 9A to 9C. With reference to FIGS. 9A to 9C, the portions common with FIG. 1 are referred to by the same reference numerals, and the detailed explanation thereof is not repeated. As an example, as illustrated in FIG. 9A, consider a case in which the other vehicle 22 is parked in between the other vehicle 21, which is the oncoming vehicle, and the target vehicle 20; and the pedestrian 23 is present behind the parked other vehicle 22 when seen from the target vehicle 20. Moreover, in the example illustrated in FIG. 9A, one other vehicle 24 is running in the same traffic lane as the target vehicle 20, and a sign 12 is placed near the left side of the street 10 when seen from the target vehicle 20.

In such a situation, as illustrated in FIG. 9B, in the taken image 41' that is taken by the imaging device 31 mounted on the other vehicle 21, an image of the pedestrian 23 is included and an image of the parked other vehicle 22 is included behind the pedestrian 23. As illustrated in FIG. 9C, in the taken image 40' taken by the camera 3030 that, from among the cameras 3030 mounted on the target vehicle 20, has the common imaging range with the imaging device 31; although an image of the parked other vehicle 22 is included, an image of the pedestrian 23 who is present behind the other vehicle 22 when seen from the target vehicle 20 is not included.

In this case, the associating unit 321 according to the first embodiment associates the image of the parked other vehicle 22, which appears around the target object (the image of the pedestrian 23) detected from the taken image 41' by the detecting unit 320, with the image of the parked other vehicle 22, which is included in the taken image 40' that is taken by the camera 3030 mounted on the target vehicle 20 and having the common imaging range to the imaging device 31 mounted on the other vehicle 21 representing the oncoming vehicle.

Figure 10:
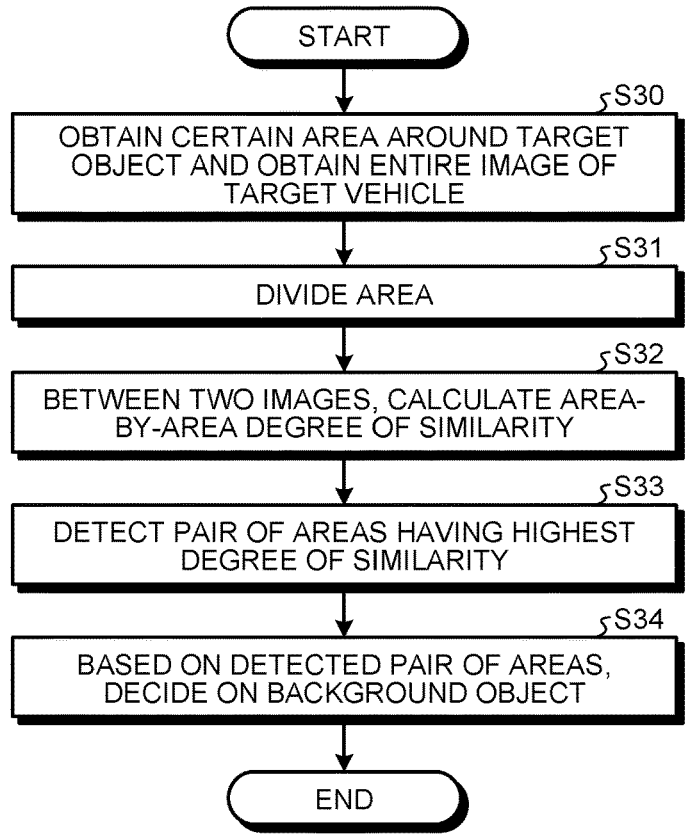
FIG. 10 is an exemplary flowchart for explaining the operations performed to associate images among the taken images.

FIG. 10 is an exemplary flowchart for explaining the operations performed by the associating unit 321 to associate images among the taken images. At Step S30, the associating unit 321 obtains an image of a certain area around the target object in the taken image 41' (called the detection target capturing image 41') including the image of the target object, and obtains the entire taken image 40' (called the common-range taken image 40') that is taken by the camera 3030 mounted on the target vehicle, and having the common imaging range to the taken image 41'.

Figure 11:
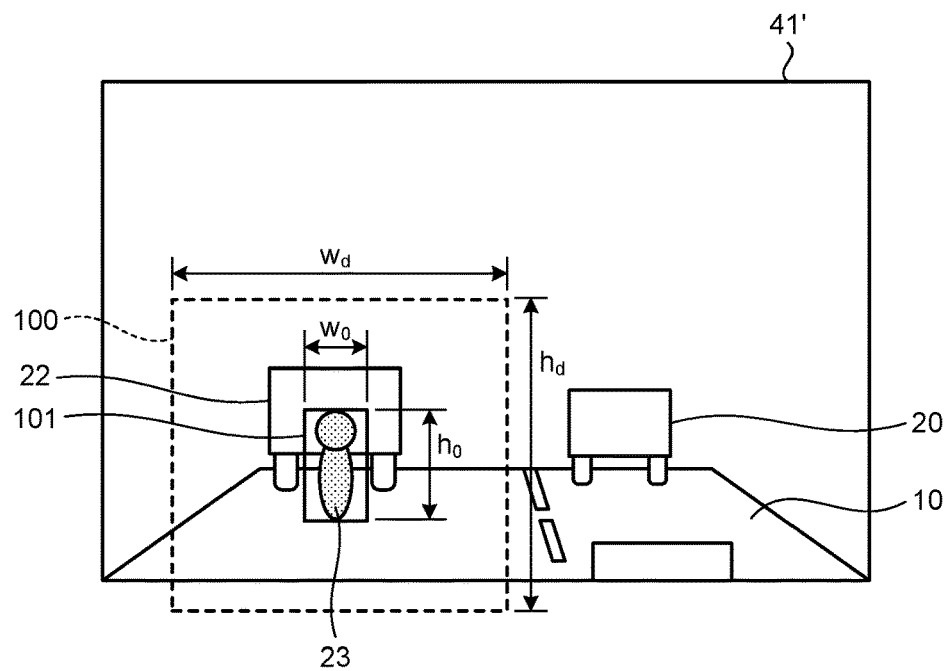
FIG. 11 is a diagram for explaining a method for setting a certain area around the target object.

Explained below with reference to FIG. 11 is an overview of a method for setting a certain area around the target object according to the first embodiment. With reference to FIG. 11, the portions common with FIGS. 9A to 9C are referred to by the same reference numerals, and the detailed explanation thereof is not repeated. In the detection target capturing image 41', a detection target rectangle image 101 is set as the smallest rectangle image including the image of the pedestrian 23 that represents the target object. An area 100 having a certain size around the detection target rectangle image 101 is obtained as the search range for searching background objects in the detection target capturing image 41'. Meanwhile, in the example illustrated in FIG. 11, some part of the lower end of the area 100 protrudes from the lower end of the detection target capturing image 41'.

For example, assume that $w_0$ represents the width and $h_0$ represents the height of the detection target rectangle image 101, and assume that $w_d = p \times w_0$ represents the width and $h_d = q \times h_0$ represents the height of the area 100. Herein, p and q are values greater than 1. In the example illustrated in FIG. 11, the value p is set to be approximately equal to 5, and the value q is set to be approximately equal to 3. As an example, it is possible to think of a case in which the values p and q are set in the range of 2 to 10 and, with one of the width $w_d$ and the height $h_d$ serving as the reference, the shape of the area 100 is set to be a square or set to be a rectangle having a predetermined ratio of the height to the width.

Figure 12A:
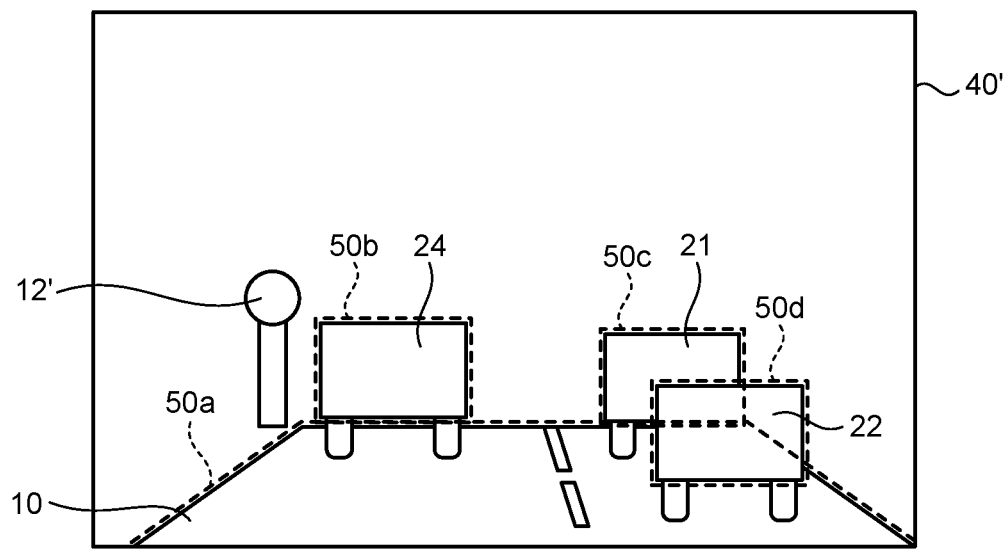
FIGS. 12A and 12B are diagrams for explaining division operations performed.
Figure 12B:
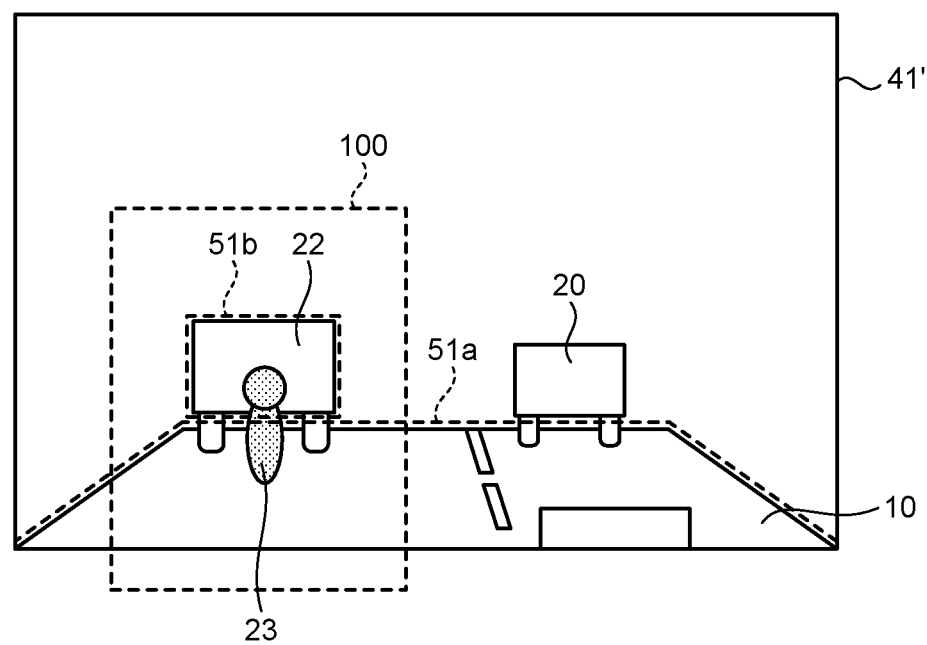

At Step S31, the associating unit 321 divides the common-range taken image 40', which is obtained at Step S30, and the area 100 in a predetermined manner. More specifically, the associating unit 321 includes the dividing unit 322 that divides the common-range taken image 40' and the area 100 based on color information and edge information. Explained with reference to FIGS. 12A and 12B are the division operation performed by the dividing unit 322 according to the first embodiment. In FIGS. 12A and 12B, the portions common with FIGS. 9A to 9C and 11 are referred to by the same reference numerals, and the detailed explanation thereof is not repeated.

In FIG. 12A is illustrated an example of the division operation performed with respect to the common-range taken image 40'. The dividing unit 322 obtains the color information of each pixel in the common-range taken image 40', and obtains the edge information by performing edge detection with respect to the common-range taken image 40'. Herein, the edge detection can be performed according to a known edge detection method. In the example illustrated in FIG. 12A, in the common-range taken image 40', based on the color information and the edge information, the dividing unit 322 detects an area 50a corresponding to the road surface of the street 10 and detects areas 50b, 50c, and 50d corresponding to the other vehicles 21, 22, and 24, respectively. Then, the dividing unit 322 obtains the detected areas 50a to 50d as divided areas from the common-image taken image 40'.

In FIG. 12B is illustrated an example of the division operation performed with respect to the area 100 that represents the search range for searching background objects in the detection target capturing image 41'. In an identical manner to the earlier explanation, the dividing unit 322 obtains the color information of each pixel in the area 100, and obtains the edge information by performing edge detection with respect to the area 100. Then, based on the color information and the edge information of the obtained area 100, the dividing unit 322 detects an area 51a corresponding to the road surface of the street 10 and detects an area 51b corresponding to the other vehicle 22. Then, the dividing unit 322 obtains the detected areas 51b and 51b as divided areas from the area 100 that represents the search range for searching background objects.

Meanwhile, the detection of the areas 50a and 51a corresponding to the road surface of the street 10 can be done according to a different method than the method for detecting other background objects. For example, the dividing unit 322 can detect the road surface based on the color (texture) information. Alternatively, if the installation angle of the camera is known, then the dividing unit 322 can detect a position in the detection target capturing image 41', that is, a predetermined range in the lower part of the detection target capturing image 41' as the road surface. Then, to the areas 50a and 51a that are detected as the road surface of the street 10, the associating unit 321 attaches attribute information indicating the street.

Moreover, for example, as is the case with the area 50c illustrated in FIG. 12A, depending on the anteroposterior relationship of the corresponding object, there is a possibility that the divided area is obtained in a significantly different shape than the original shape of the object. For example, it is possible to think of a case in which the dividing unit 322 estimates the original shape based on the edge information, and obtains the estimated shape as the divided area.

Subsequently, at Step S32, between the common-range taken image 40' and the area 100 that is included in the detection target capturing image 41', the associating unit 321 obtains the feature quantity for each divided area and calculates the degree of similarity based on each feature quantity. In the examples illustrated in FIG. 12A and FIG. 12B, the associating unit 321 calculates the degree of similarity between each the areas 50a to 50d, which are obtained in the common-range taken image 40' illustrated in FIG. 12A, and each of the areas 51a and 51b, which are obtained in the area 100 in the detection target capturing image 41' illustrated in FIG. 12B.

As far as the feature quantity of each area is concerned, it is possible to use the pixel-by-pixel color information in each area or the edge information in each area. Alternatively, it is possible to use the texture of each area as the feature quantity. The degrees of similarity between feature quantities can be obtained using the L1 norm between the feature quantities or the Bhattacharyya distance between the feature quantities.

Meanwhile, the associating unit 321 can associate images based on the output result that is identified by a classifier after the two feature quantities to be compared are integrated into a single feature quantity. Herein, for example, a support vector machine (SVM) can be used as the classifier. For example, regarding a first feature quantity of a single area, the associating unit 321 can calculate the degree of similarity between the first feature quantity and each of a plurality of second feature quantities of a plurality of areas, and can determine that the second feature quantity for which the calculated degree of similarity is the highest is associated to the first feature quantity. However, that is not the only possible case. Alternatively, the associating unit 321 can determine that the feature quantities for which the degree of similarity is equal to or greater than a threshold value are associated to each other.

Meanwhile, it is desirable to exclude the areas 50a and 51a, which are obtained by division corresponding to the street 10, from the calculation of the degree of similarity. In that case, the associating unit 321 calculates the degree of similarity between the area 51b, which is obtained in the area 100 in the detection target capturing image 41', and each of the areas 50a to 50d, which are obtained in the common-range taken image 40'.

Subsequently, at Step S33, the associating unit 321 obtains the highest degree of similarity from among the degrees of similarity calculated at Step S32, and detects a pair of the divided area in the common-range taken image 40' and the divided area in the area 100 as the pair of areas for which the highest degree of similarity is calculated. In the examples illustrated in FIG. 12A and FIG. 12B, the pair of the area 50d, which is obtained by division in the common-range taken image 40', and the area 51b, which is obtained by division in the detection target capturing image 41', is assumed to serve as the pair of areas for which the highest degree of similarity is calculated.

Subsequently, at Step S34, based on the pair of areas detected at Step S33, the associating unit 321 decides on the background objects with respect to the target object. In the example illustrated in FIG. 12B, the object corresponding to the area 51b (in this example, the other vehicle 22) is treated as the background object, and the area 51b is treated as a background object area.

Meanwhile, at Step S33 explained earlier, although the pair of areas having the highest degree of similarity from among the degrees of similarity is detected, that is not the only possible case. Alternatively, the associating unit 321 can detect a plurality of pairs. For example, it is possible to think of a case in which, from among the degrees of similarity calculated at Step S32, the associating unit 321 sets a predetermined range with respect to the highest degree of similarity; obtains the highest degree of similarity and the degrees of similarity present within the set range; and detects a plurality of pairs of areas corresponding to the obtained degrees of similarity.

Regarding a clipping operation according to the first embodiment for clipping the target object and background objects as a detection rectangle image, the explanation is given below with reference to the flowchart illustrated in FIG. 13 and with reference to FIGS. 14 to 18. In FIGS. 14 to 18, the portions common with FIGS. 9A to 9C and 11 are referred to by the same reference numerals, and the detailed explanation thereof is not repeated. The clipping unit 323 clips a detection rectangle image that represents a rectangle which includes an area of a certain percentage of the smallest rectangle including the entire detection target rectangle image 101 detected by the detecting unit 320 and an image of the background object area obtained by the associating unit 321.

Figure 13:
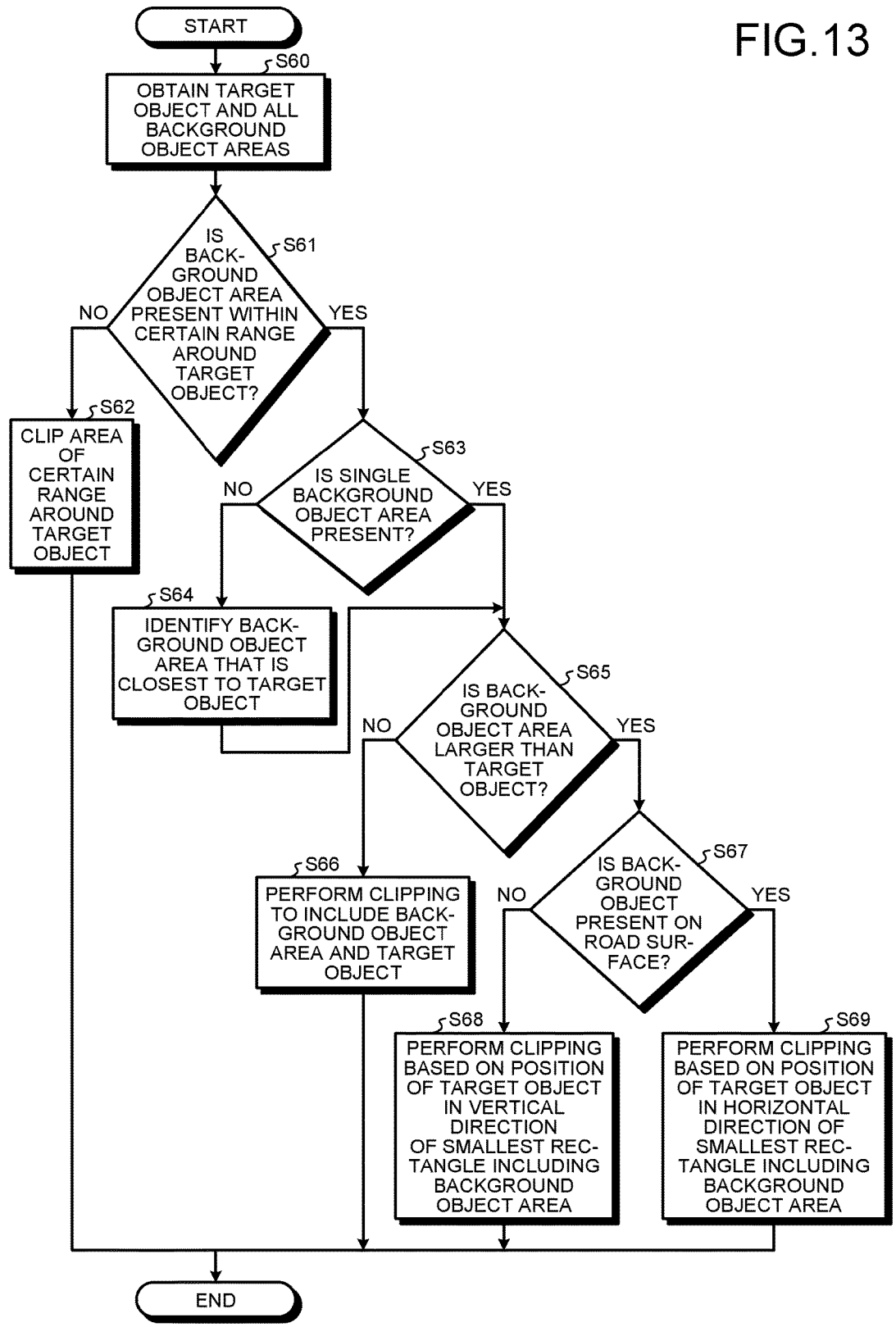
FIG. 13 is an exemplary flowchart for explaining an operation of clipping the target object and the background object as a detection rectangle image.

In the flowchart illustrated in FIG. 13, at Step S60, the clipping unit 323 obtains the detection target capturing image 41' in which the target object is detected. Moreover, the clipping unit 323 obtains the image of the background object area, which is obtained by the associating unit 321 at Step S14 illustrated in FIG. 5, and the detection target rectangle image 101. When images of a plurality of background object areas are obtained at Step S14, the clipping unit 323 obtains all of the images of a plurality of background object areas.

Then, at Step S61, the clipping unit 323 determines whether or not, in the detection target capturing image 41', the background object area is present within a predetermined range around the detection target rectangle image 101. Herein, as the predetermined area for determining the presence or absence of the background object area, the clipping unit 323 can set the area 100 representing the search range set at the time of searching for background objects at Step S14 illustrated in FIG. 5. However, that is not the only possible case. Alternatively, a range smaller than the area 100 can be set as the predetermined range. If the clipping unit 323 determines that the background object area is not present in the predetermined range, then the system control proceeds to Step S62.

Figure 14:
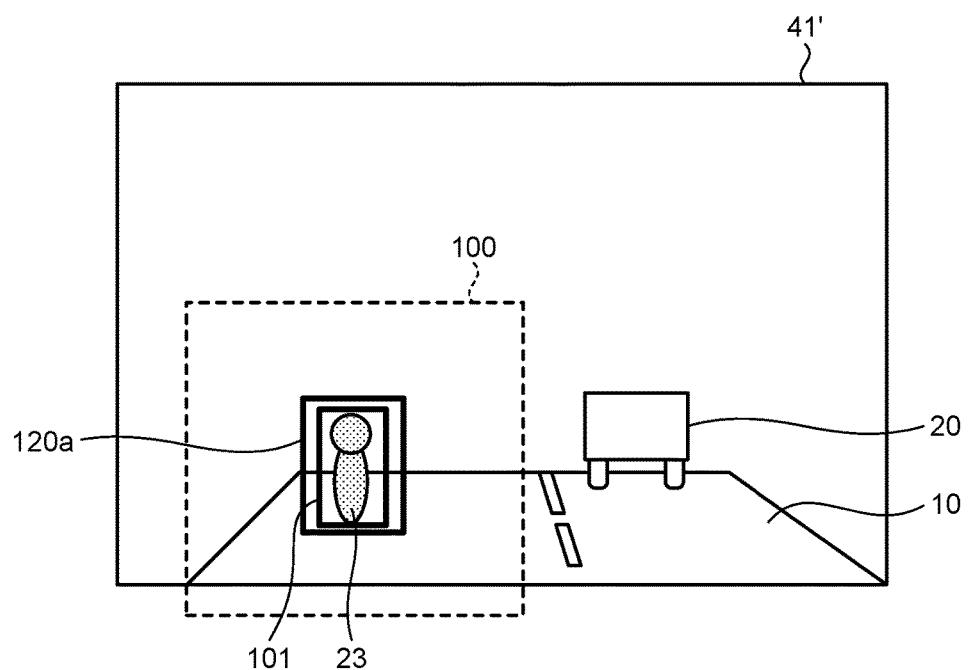
FIGS. 14 to 18 are diagrams for explaining the operation of clipping a detection rectangle image.

At Step S62, the clipping unit 323 clips an area of a certain range centered on the detection target rectangle image 101. In FIG. 14 is illustrated an example in which the background object area is not present in a predetermined range (in this example, the area 100) around the detection target rectangle image 101. In that case, the clipping unit 323 clips, from the detection target capturing image 41', the detection rectangle image in the form of an area 120a of a certain range centered on the detection target rectangle image 101. After the area 120a is clipped, it marks the end of the sequence of operations illustrated in the flowchart in FIG. 13.

The clipping unit 323 either can store an image of the clipped area 120a in the RAM 3002; or can store, in the RAM 3002, the coordinates of the area 120a and information enabling identification of the detection target capturing image 41' representing the source of clipping. Moreover, the area 120a either can be the same size as the size of the detection target rectangle image 101; or can be of a little larger size than the size of the detection target rectangle image 101, such as about 1.2 times larger in width and height than the detection target rectangle image 101. The appropriate size of the area 120a can be decided by way of experiment.

At Step S61, if the clipping unit 323 determines that the background object area is present in the predetermined range around the detection target rectangle image 101, then the system control proceeds to Step S63. At Step S63, the clipping unit 323 determines whether or not a single background object area is present in the predetermined range around the detection target rectangle image 101. If the clipping unit 323 determines that a plurality of background object areas is present in the predetermined range, then the system control proceeds to Step S64.

At Step S64, the clipping unit 323 performs clipping in such a way that, from among a plurality of background object areas present in the predetermined range, a rectangle including an area of a certain percentage of the rectangle that includes the background object area having the shortest distance to the detection target rectangle image 101 in the detection target capturing image 41' is included in the clipped area along with the detection target rectangle image 101.

Figure 15:
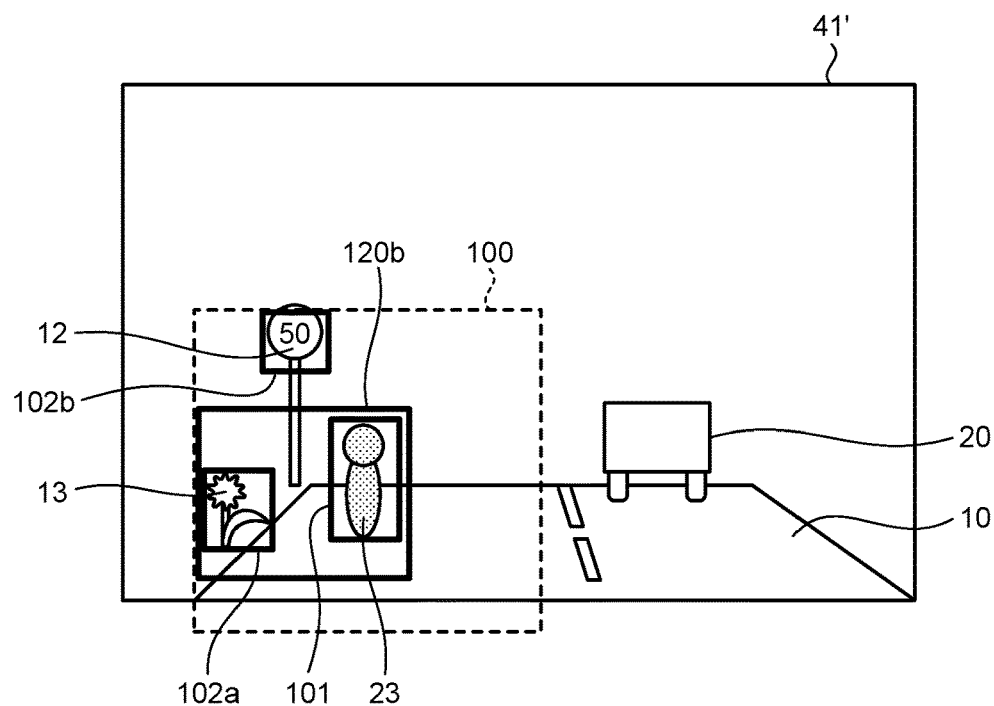

In FIG. 15 is illustrated an example in which a plurality of background object areas 102a and 102b is present in the predetermined range (the area 100) around the detection target rectangle image 101. In this example, an area including an image of a flower 13 is obtained as the background object area 102a, and an area including an image of the sign 12 is obtained as the background object area 102b. With reference to FIG. 15, when the distance between the center of gravity of the detection target rectangle image 101 and the center of gravity of each of the background object areas 102a and 102b is obtained, it is found that the background object area 102a is closer to the detection target rectangle image 101 as compared to the background object area 102b. For that reason, the clipping unit 323 identifies the background object area 102a as the background object area to be clipped, and the system control proceeds to Step S65.

The calculation of the distance between the detection target rectangle image 101 and each of the background object areas 102a and 102b is not limited to the example of using the centers of gravity. Alternatively, for example, the clipping unit 323 can calculate the distances based on the center position, the apex, and the edges of each of the detection target rectangle image 101 and the background object areas 102a and 102b.

Meanwhile, at Step S63 explained earlier, if it is determined that a single background object area is present in the predetermined range around the detection target rectangle image 101, then the clipping unit 323 identifies that background object area as the background object area to be clipped, and the operation proceeds to Step S65.

At Step S65, the clipping unit 323 compares the background object area, which is identified as the target for clipping at Step S63 or Step S64, with the detection target rectangle image 101 and determines whether or not the background object area is larger than the detection target rectangle image 101.

As a result of comparison between the background object area and the detection target rectangle image 101, if the height and the width of the smallest rectangle including the background object area is smaller than a predetermined percentage of the height and the width of the detection target rectangle image 101, then the clipping unit 323 determines that the background object area is smaller than the detection target rectangle image 101. When the clipping unit 323 determines that the background object area is smaller than the detection target rectangle image 101, the system control proceeds to Step S66.

Figure 16:
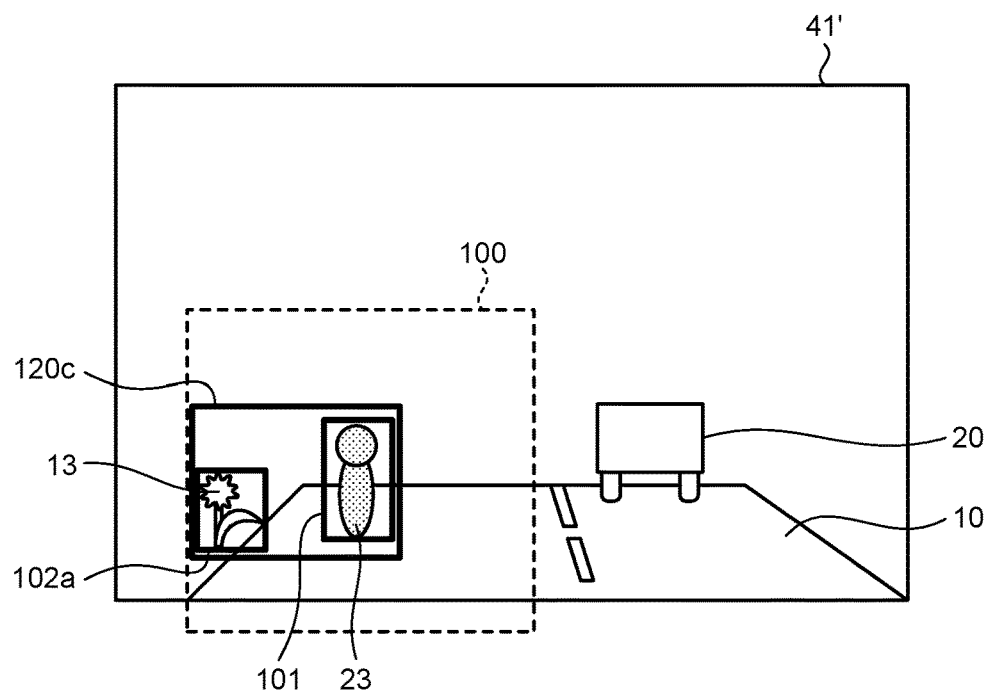

At Step S66, the clipping unit 323 clips a rectangle including the background object area and the detection target rectangle image 101. In FIG. 16 is illustrated an example in which the background object area is smaller than the detection target rectangle image 101. In the example illustrated in FIG. 16, the width and the height of the background object area 102a is smaller than the width and the height of the detection target rectangle image 101. For that reason, the clipping unit 323 clips a rectangle area 120c, which includes the background object area 102a and the detection target rectangle image 101, as the detection rectangle image from the detection target capturing image 41'. Once the area 120c is clipped, it marks the end of the sequence of operations in the flowchart illustrated in FIG. 13.

At Step S65, when the clipping unit 323 determines that the background object area is larger than the detection target rectangle image 101, the system control proceeds to Step S67. For example, when at least one of the width and the height of the background object area 102a is greater than the width or the height of the detection target rectangle image 101, the clipping unit 323 determines that the background object area is larger than the detection target rectangle image 101.

At Step S67, the clipping unit 323 estimates the road surface of the street 10 in the detection target capturing image 41' and determines whether or not the background object captured in the background object area is an object on the road surface. For example, at Step S31 in the flowchart illustrated in FIG. 10, based on the area 51a of the road surface as obtained by division in the detection target capturing image 41', the clipping unit 323 can determine whether or not the background object is an object on the road surface. However, that is not the only possible case. Alternatively, at Step S67, an area of the road surface can be detected in an identical manner to the earlier explanation. For example, when the bottom side of the background object area is included within the area of the road surface, the clipping unit 323 can determine that the background object is an object on the road surface.

At Step S67, if the clipping unit 323 determines that the background object captured in the background object area is not an object on the road surface, then the system control proceeds to Step S68. At Step S68, the clipping unit 323 clips a rectangle that includes such an area of the smallest rectangle including the background object area which, in the vertical direction in the detection target capturing image 41', has a certain percentage from the side of the rectangle closer to the in-image position of the detection target rectangle image 101, and that includes the entire detection target rectangle image 101.

Figure 17:
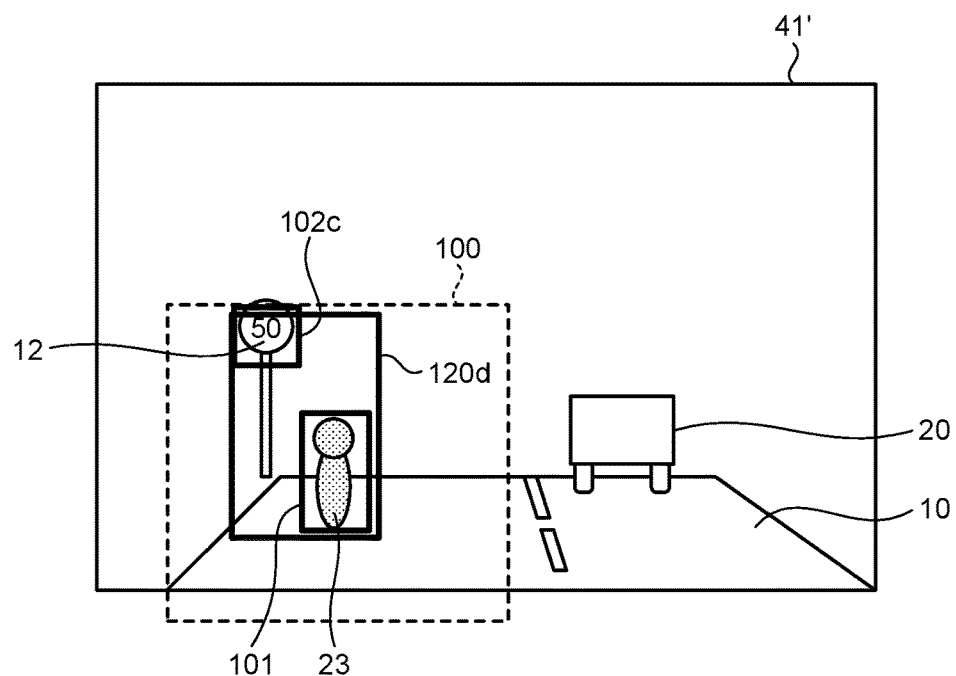

In FIG. 17 is illustrated an example in which the background object captured in the background object area is not an object on the road surface. In the example illustrated in FIG. 17, the smallest rectangle including a background object area 102c is identical to the background object area 102c itself, and has a greater width than the width of the detection target rectangle image 101. For that reason, the background object area 102c can be determined to be larger than the detection target rectangle image 101. Moreover, since the bottom side of the background object area 102c is not included in the area of the road surface in the image, the background object can be determined not to be an object on the road surface.

Moreover, in FIG. 17, that side of the background object area 102c which is closer in the vertical direction to the in-image position of the detection target rectangle image 101 becomes the bottom side of the background object area 102c. Therefore, the clipping unit 323 clips, as the detection rectangle image from the detection target capturing image 41', an area 120d of the rectangle that includes the entire detection target rectangle image 101 and an area of a certain percentage of the background object area 102c.

In the example illustrated in FIG. 17, the area 120d includes the entire width and about 80% of the height of the background object area 102c. However, that is not the only possible case. Alternatively, the area 120d can include the background object area 102c in entirety, or can include up to a certain percentage of the width and up to a certain percentage of the height of the background object area 102c. Once the area 120d is clipped, it marks the end of the sequence of operations in the flowchart illustrated in FIG. 13.

Meanwhile, at Step S67, if the clipping unit 323 determines that the background object captured in the background object area is an object on the road surface, then the system control proceeds to Step S69. At Step S69, the clipping unit 323 clips a rectangle that includes such an area of the smallest rectangle including the background object area which, in the horizontal direction in the detection target capturing image 41', has a certain percentage from the side of the rectangle closer to the in-image position of the detection target rectangle image 101, and that includes the entire detection target rectangle image 101.

Figure 18:
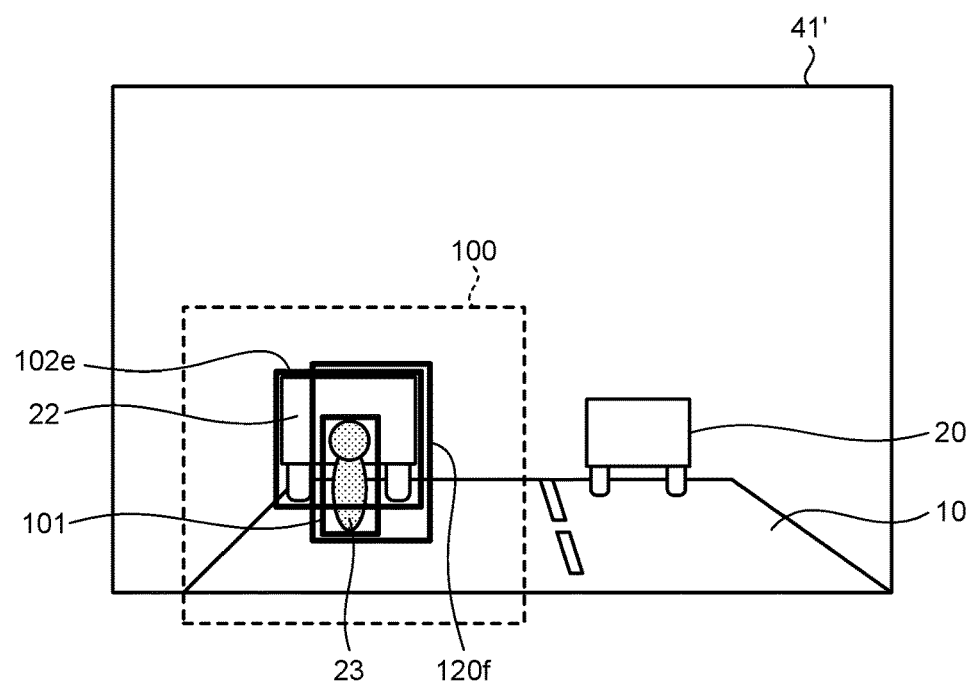

In FIG. 18 is illustrated an example in which the background object captured in the background object area is an object on the road surface. In the example illustrated in FIG. 18, the smallest rectangle including a background object area 102e is identical to the background object area 102e itself, and has a greater width and a greater height than the width and the height of the detection target rectangle image 101. For that reason, the background object area 102e can be determined to be larger than the detection target rectangle image 101. Moreover, since the bottom side of the background object area 102e is included in the area of the road surface in the image, the background object can be determined to be an object on the road surface.

Moreover, that side of the background object area 102b which is closer in the horizontal direction to the in-image position of the detection target rectangle image 101 becomes the right-hand side of the background object area 102e. Therefore, the clipping unit 323 clips, as the detection rectangle image from the detection target capturing image 41', an area 120f of the rectangle that includes the entire detection target rectangle image 101 and an area of a certain percentage of the background object area 102e.

In the example illustrated in FIG. 18, the area 120f includes the entire height and about 80% of the width of the background object area 102e. However, that is not the only possible case. Alternatively, the area 120f can include the background object area 102e in entirety, or can include up to a certain percentage of the width and up to a certain percentage of the height of the background object area 102e. Once the area 120f is clipped, it marks the end of the sequence of operations in the flowchart illustrated in FIG. 13.

The following explanation is given about the operation performed at Step S16 illustrated in FIG. 5 for generating detection information. At Step S16, the detection information generating unit 324 obtains, from the obtaining unit 310, the position information indicating the imaging position of the detection target rectangle image 101. Then, the detection information generating unit 324 generates detection information that contains the obtained position information and the detection rectangle image clipped from the detection target capturing image 41' at Step S15.

The following explanation is given about the operation performed at Step S17 illustrated in FIG. 5 for generating display information. At Step S17, based on the target vehicle surroundings image generated by the surroundings image generating unit 311 at Step S11 and based on the detection information generated by the detection information generating unit 324 at Step S16, the display information generating unit 325 generates display information indicating the display screen to be presented to the user.

Figure 19A:
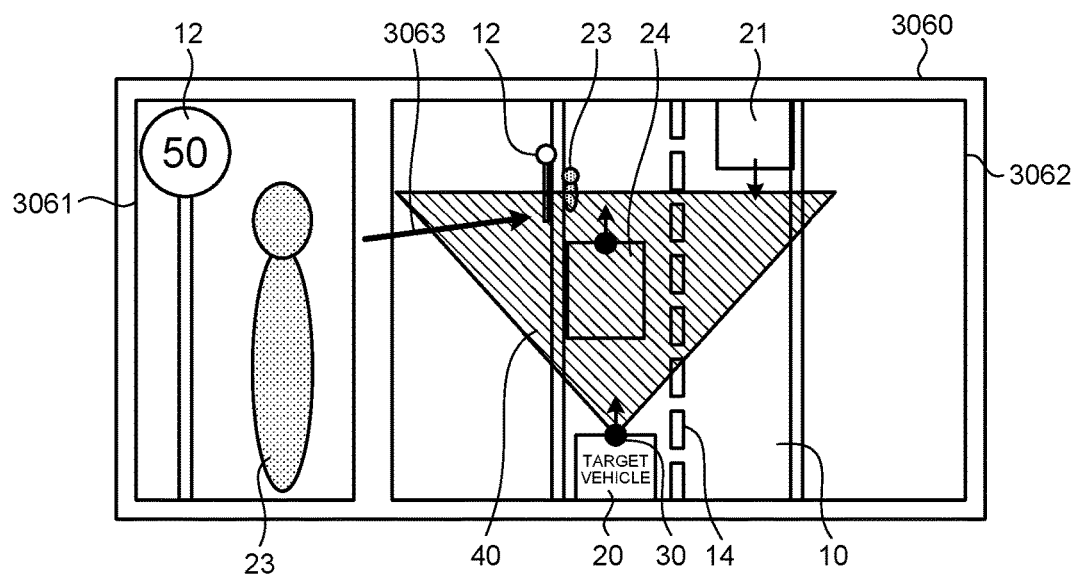
FIGS. 19A and 19B are diagrams illustrating exemplary display images.
Figure 19B:
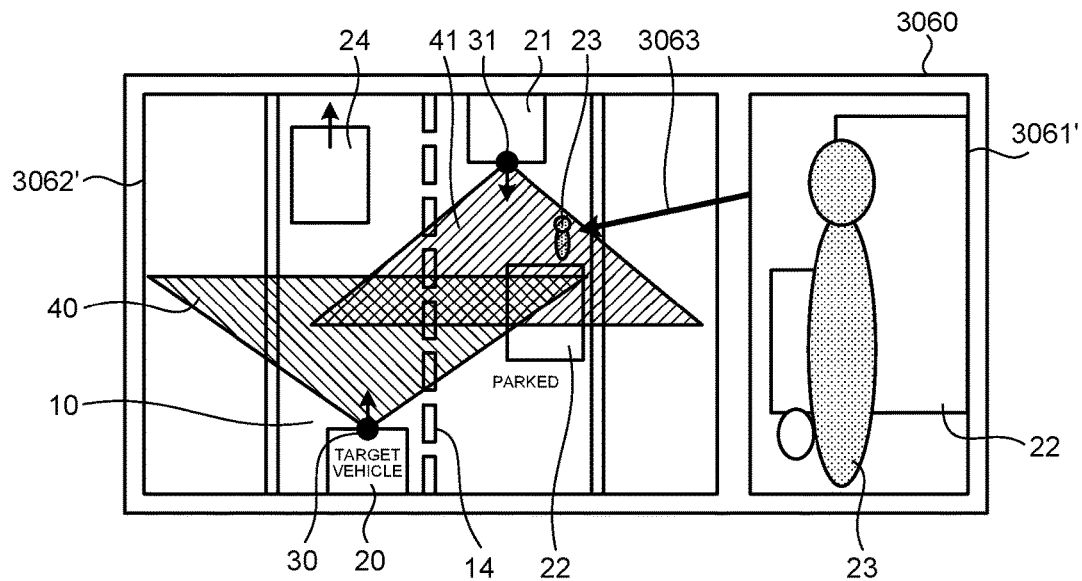

In FIG. 19A and FIG. 19B are illustrated exemplary display images displayed on the display device 3020 based on the display information. In FIG. 19A and FIG. 19B, the portions common with FIGS. 9A to 9C, FIG. 11, and FIGS. 14 to 18 are referred to by the same reference numerals, and the detailed explanation thereof is not repeated.

The display information generating unit 325 generates display information indicating the display screen that includes the detection rectangle image included in the detection information and the target vehicle surroundings image. At that time, the display information generating unit 325 places the detection rectangle image along with the position information at the position in the target vehicle surroundings image or surrounding the target vehicle surroundings image according to the position information included in the detection information.

At that time, according to the imaging position of the detection target capturing image that includes the image of the target object included in the detection rectangle image, the display information generating unit 325 decides whether to place the detection rectangle image on either the right-hand side or on the left-hand side of the target vehicle surroundings image. For example, when the imaging position of the detection target capturing image 41', in which the target object is detected, is included in the area of the traffic lane in which the target vehicle 20 is running; the detection rectangle image including the image of the target object is placed on the side of the concerned traffic lane (on the left-hand side) in the target vehicle surroundings image.

In FIG. 19A, in a display screen 3060 displayed on the display device 3020, a target vehicle surroundings image 3062 is placed on the right-hand side; and a detection rectangle image 3061 is placed on the left-hand side of the target vehicle surroundings image 3062. Herein, in the target vehicle surroundings image 3062 displayed on the display screen 3060, the center line 14 is displayed, and a situation is illustrated in which the target vehicle 20 and the other vehicle 24 are running in the left-hand traffic lane. Moreover, in the target vehicle surroundings image 3062, it is illustrated that the pedestrian 23 is present behind the other vehicle 24 when seen from the target vehicle 20, and the sign 12 is mounted on the vicinity of the pedestrian 23. Furthermore, in the target vehicle surroundings image 3062, the position of the camera 3030 of the target vehicle 20 is illustrated along with the imaging range 40 taken by the camera 3030, as well as information identifying the target vehicle 20 (for example, a label "target vehicle") is illustrated.

Herein, when seen from the target vehicle 20, the pedestrian 23 is hidden behind the other vehicle 24 that is running in front of the target vehicle 20, and thus the pedestrian 23 is not visible. As described above, the target vehicle surroundings image 3062 is generated by the surroundings image generating unit 311 as an overhead view image formed by synthesizing a plurality of taken images taken from mutually different directions. Hence, the driver of the target vehicle 20 may find it difficult to recognize the presence of the pedestrian 23 and the sign 12 due to image distortion in the target vehicle surroundings image 3062.

Meanwhile, the detection rectangle image 3061 displayed on the display screen 3060 is formed by clipping from a single detection target capturing image 41'. Hence, from the detection rectangle image 3061, the driver of the target vehicle 20 can easily recognize the pedestrian 23, who is the target object, and the sign 12, which is the background object with respect to the target object. Moreover, in the detection rectangle image 3061, an image of the background object (in this example, the sign 12) that is recognizable from the target vehicle 20 is included. Hence, the driver of the target vehicle 20 can easily get to know the positional relationship with the pedestrian 23.

In the display screen 3060, it is desirable to display a display 3063 that indicates the association between the detection rectangle image 3061 and the target vehicle surroundings image 3062. That enables easier understanding of the position of the pedestrian 23.

In FIG. 19B is illustrated an example of the display screen 3060 in the case in which the position of the detection target capturing image 41', in which the target object is detected, is included in the area of the oncoming traffic lane with respect to the target vehicle 20. In the example illustrated in FIG. 19B, a detection rectangle image 3061', which includes an image of the target object, is placed on the side of the oncoming traffic lane (on the right-hand side) of a target vehicle surroundings image 3062'.

As illustrated in FIG. 19A and FIG. 19B, the detection rectangle images 3061 and 3061' are placed on that side of the target vehicle surroundings images 3062 and 3062', respectively, which is the side of the traffic lane in which the image of the target object is taken. As a result, the driver of the target vehicle 20 can recognize the position of the target object (the pedestrian 23) in a more intuitive manner.

In FIG. 19B, the center line 14 is displayed in the target vehicle surroundings image 3062' that is displayed on the display screen 3060; and a situation is illustrated in which the target vehicle 20 and the other vehicle 24 are running in the left-hand traffic lane, and the other vehicles 21 and 22 are present in the right-hand traffic lane. Moreover, in the target vehicle surroundings image 3062', a label "parked" indicating the state of the other vehicle 22 is placed near the other vehicle 22 so as to indicate that the other vehicle 22 is currently parked.

Moreover, in the target vehicle surroundings image 3062', a situation is illustrated in which the pedestrian 23 is present behind the other vehicle 22 when seen from the target vehicle 20. Furthermore, in the target vehicle surroundings image 3062', the position of the camera 3030 of the target vehicle 20 is illustrated along with the imaging range 40 of the camera 3030, as well as the position of the imaging device 31 in the other vehicle 21 and the imaging range 41 of the imaging device 31 are illustrated.

Meanwhile, in FIG. 19B, the detection rectangle image 3061' is clipped from the detection target capturing image 41' which is taken from the other vehicle 21 running in the oncoming traffic lane with respect to the target vehicle 20. Hence, as compared to the case of seeing from the target vehicle 20, the left-hand side and the right-hand side are reversed. For that reason, the display information generating unit 325 generates an image in which the left-hand side and the right-hand side of the detection rectangle image, which is included in the detection information obtained from the detection information generating unit 324, are reversed; and displays the mirror-reversed image as the detection rectangle image 3061' on the display screen 3060.

In the example illustrated in FIG. 19B too, the detection rectangle image 3061' includes an image of the background object (in this example, the other vehicle 22) which is recognizable from the target vehicle 20. Hence, the driver of the target vehicle 20 can easily get to know the positional relationship with the pedestrian 23.

Second Embodiment

Figure 20:
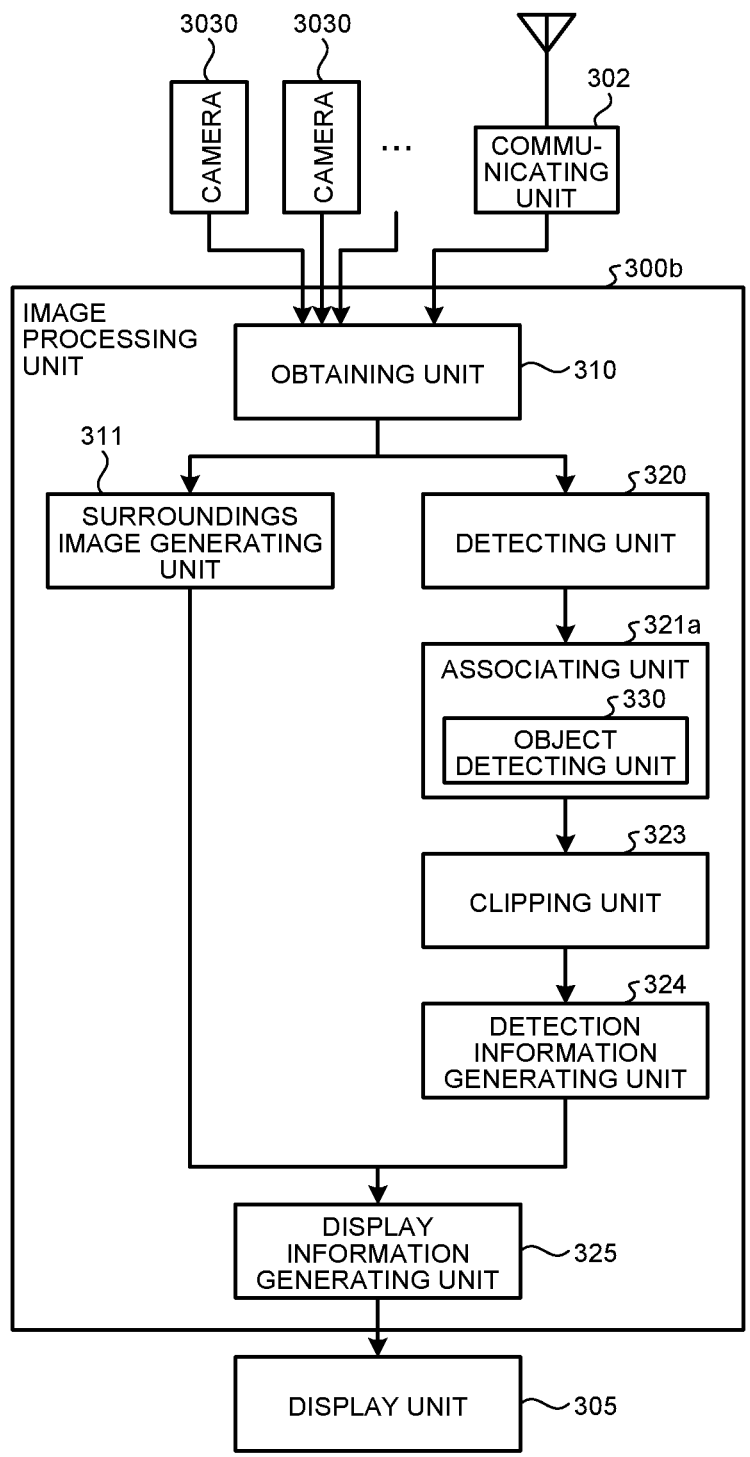
FIG. 20 is a functional block diagram for explaining the functions of an image processing unit according to a second embodiment.

Given below is the explanation of a second embodiment. FIG. 20 is a functional block diagram for explaining the functions of an image processing unit according to the second embodiment. In the second embodiment, the configuration of the image processing system explained with reference to FIGS. 1 and 2 as well as the hardware configuration of the driving support device 30 can be implemented without modification. Hence, the explanation of that part is not repeated. Moreover, with reference to FIG. 20, the portions common with FIG. 4 are referred to by the same reference numerals, and the detailed explanation thereof is not repeated.

As illustrated in FIG. 20, in an image processing unit 300b according to the second embodiment, an associating unit 321a includes an object detecting unit 330 in place of the dividing unit 322 that is included in the associating unit 321 explained with reference to FIG. 4 according to the first embodiment. The object detecting unit 330 detects an image of the background object from a certain area around the image of the target object in the detection target capturing image 41' in which the target object is detected by the detecting unit 320.

Figure 21:
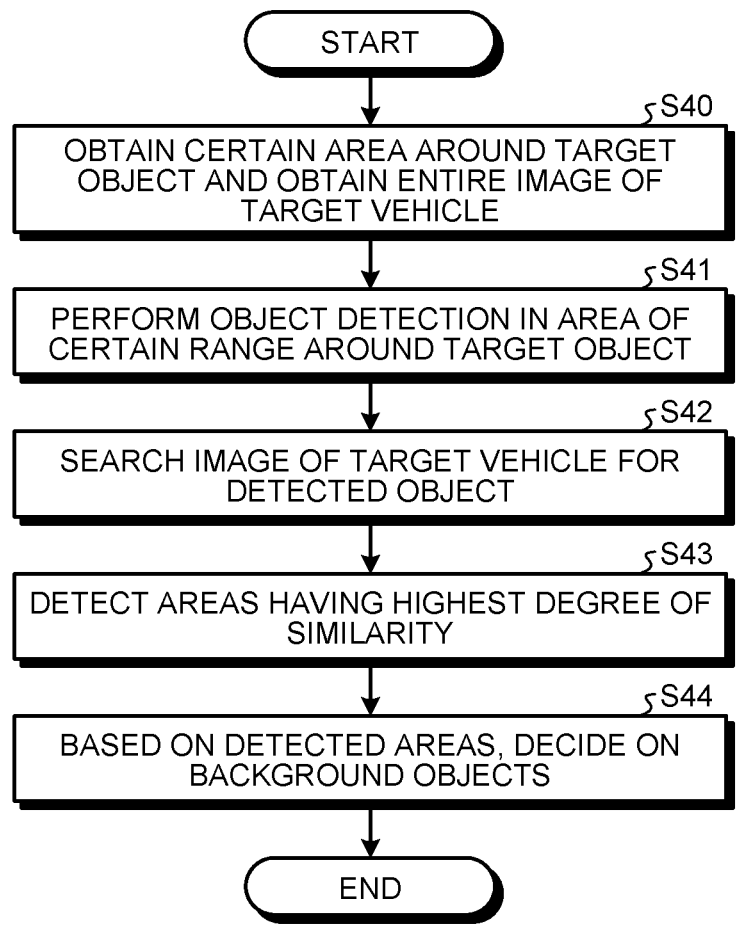
FIG. 21 is an exemplary flowchart for explaining a background object detection operation performed.

FIG. 21 is an exemplary flowchart for explaining a background object detection operation performed in the image processing unit 300b according to the second embodiment. The operations in the flowchart illustrated in FIG. 21 correspond to the operation at Step S14 in the flowchart illustrated in FIG. 5 and the operations in the flowchart illustrated in FIG. 10.

At Step S40, the associating unit 321a obtains an image of the area 100 (see FIG. 11) having a certain range around the target object in the taken image 41' (called the detection target capturing image 41') including the image of the target object, and obtains the entire taken image 40' (called the common-range taken image 40') that is taken by the camera 3030 having the common imaging range to the taken image 41'.

At Step S41, the object detecting unit 330 of the associating unit 321a detects background objects in the area 100 in the detection target capturing image 41' obtained at Step S40. Moreover, at Step S42, the object detecting unit 330 of the associating unit 321a detects background objects in the common-range taken image 40' obtained at Step S40.

In the operation of detecting background objects as performed at Steps S41 and S42, it is possible to implement, for example, the technology disclosed in Non-patent Literature 1. That is, the object detecting unit 330 creates a plurality of types of detectors each of which is dedicated to one of a plurality of types of background objects, and uses the detectors to detect the area of each background object and the in-image position of that area in the area 100 and the common-range taken image 40'.

For example, a plurality of types of detectors is created in advance, each of which is dedicated to one of a plurality of types of background objects such as a vehicle, a traffic sign, an animal, an advertising display, or, more specifically, a light motor vehicle, a truck, a bus, a directional sign, an indication sign, an auxiliary sign, a regulatory sign, a danger warning sign, a dog, a cat, or a shop sign. The object detecting unit 330 uses the detectors and detects various types of background objects.

However, that is not the only possible case. Alternatively, for example, by implementing the technology disclosed in Patent Literature 2, the object detecting unit 330 can learn about a plurality of predetermined types of background objects using a single classifier; and identify the background objects, from among the learnt background objects, that have the feature quantity close to the feature quantity in the area 100 and in the common-range taken image 40'.

Subsequently, at Step S43, based on the feature quantity of each image, the associating unit 321a calculates the degree of similarity between the area of each background object detected from the area 100 at Step S41 and the area of each background object detected from the common-range taken image 40' at Step S42. Then, from among the areas of background objects detected from the area 100 and the areas of background objects detected from the common-range taken image 40', the associating unit 321a detects pairs of areas having the highest degree of similarity. Subsequently, at Step S44, based on the pairs of areas detected at Step S43, the associating unit 321a decides on the background objects with respect to the target object.

In the second embodiment, as a result of using detectors and detecting the background objects with respect to the target object, the positions and the areas of images of the background objects can be obtained with more precision, thereby enabling clipping of the detection rectangle image with more accuracy.

Third Embodiment

Figure 22:
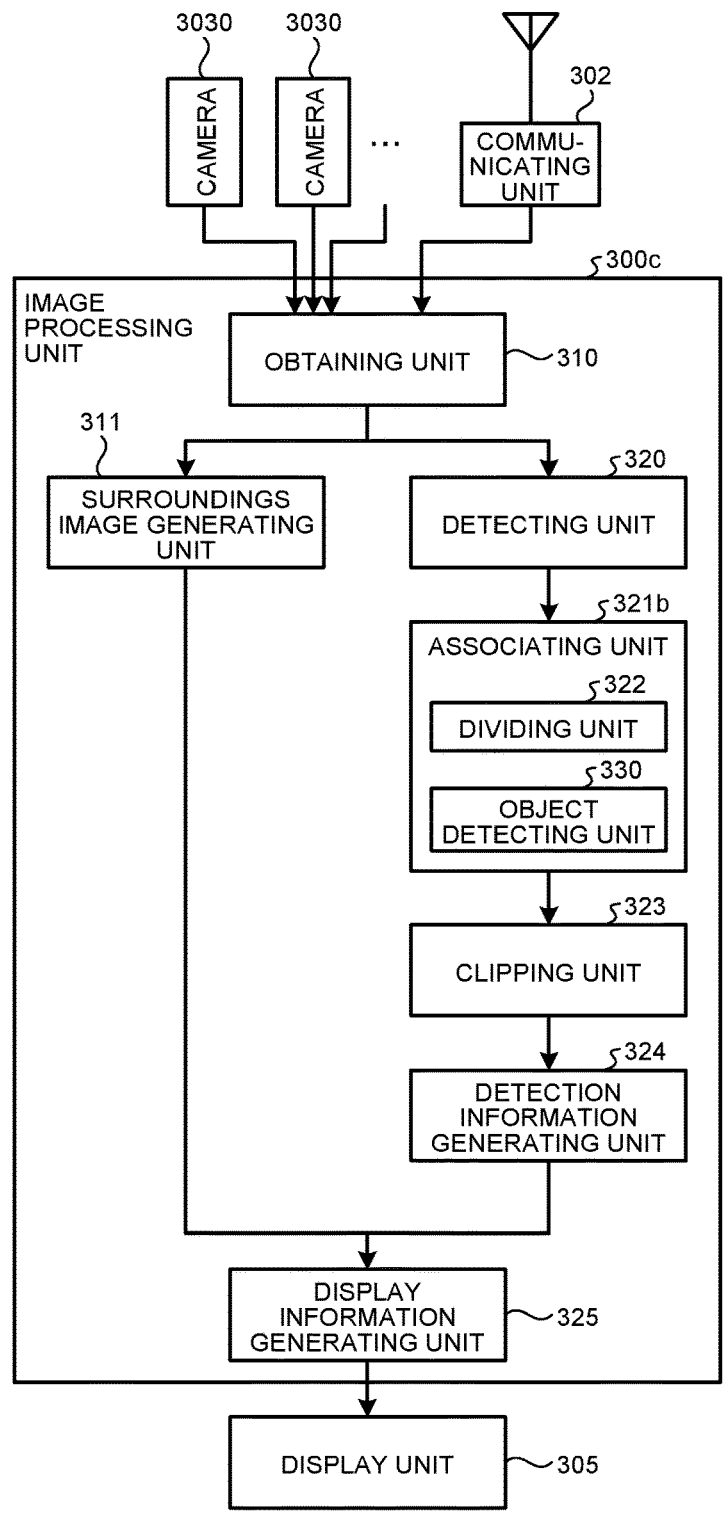
FIG. 22 is a functional block diagram for explaining the functions of an image processing unit according to a third embodiment.

Given below is the explanation of a third embodiment. FIG. 22 is a functional block diagram for explaining the functions of an image processing unit according to the third embodiment. In the third embodiment, the configuration of the image processing system explained with reference to FIGS. 1 and 2 as well as the hardware configuration of the driving support device 30 can be implemented without modification. Hence, the explanation of that part is not repeated. Moreover, with reference to FIG. 22, the portions common with FIGS. 4 and 20 are referred to by the same reference numerals, and the detailed explanation thereof is not repeated.

As illustrated in FIG. 22, in an image processing unit 300c according to the third embodiment, an associating unit 321b includes the dividing unit 322, which is included in the associating unit 321 explained with reference to FIG. 4 according to the first embodiment, as well as includes the object detecting unit 330, which is included in the associating unit 321a explained with reference to FIG. 20 according to the second embodiment.

Figure 23:
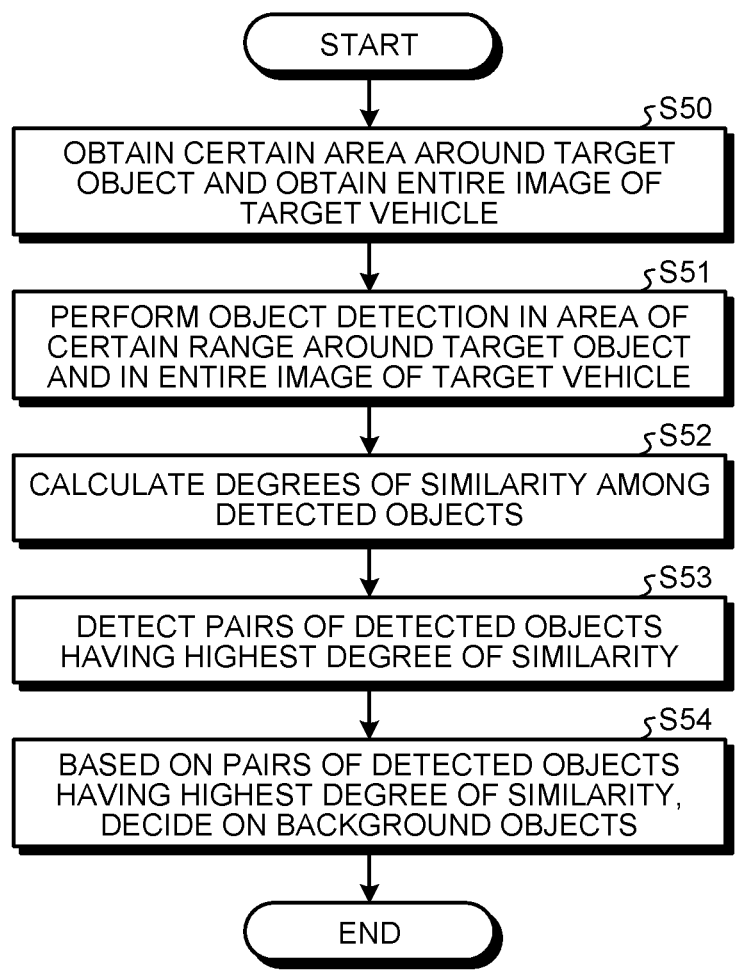
FIG. 23 is an exemplary flowchart for explaining a background object detection operation performed.

FIG. 23 is an exemplary flowchart for explaining a background object detection operation performed in the image processing unit 300c according to the third embodiment. The operations in the flowchart illustrated in FIG. 23 correspond to the operation at Step S14 in the flowchart illustrated in FIG. 5 and the operations in the flowchart illustrated in FIG. 10.

At Step S50, the associating unit 321b obtains an image of the area 100 (see FIG. 11) having a certain range around the target object in the detection target capturing image 41' including the image of the target object, and obtains the entire common-range taken image 40' that is taken by the camera 3030 having the common imaging range to the taken image 41'.

Subsequently, at Step S51, using the dividing unit 322 and the object detecting 330, the associating unit 321b detects images of background objects from the common-range taken image 40' and from the area 100 in the detection target capturing image 41'. At that time, in the associating unit 321b, the dividing unit 322 performs a division operation based on the color information and the edge information of the images, while the object detecting unit 330 performs an object detection operation based on the feature quantity of the images. As a result, the areas of background objects as detected during the division operation are obtained, as well as the areas of background objects detected during the object detection operation are obtained.

Subsequently, at Step S52, the associating unit 321b calculates the degree of similarity between each background object area detected from the area 100 and each background object area detected from the common-range taken image 40' as obtained at Step S51. At that time, the associating unit 321b calculates the degrees of similarity using at least either the color information and the edge information obtained by the dividing unit 322 or the attribute information obtained by the object detecting unit 330 as the feature quantity.

Examples of the attribute information include information indicating various types of background objects (for example, information indicating a vehicle, a traffic sign, an animal, an advertising display, or, more specifically, a light motor vehicle, a truck, a bus, a directional sign, an indication sign, an auxiliary sign, a regulatory sign, a danger warning sign, a dog, a cat, or a shop sign) detected by a plurality of types of detectors used by the object detecting unit 330.

Subsequently, at Step S53, from among the areas of background objects detected from the area 100 and the areas of background objects detected from the common-range taken image 40', the associating unit 321b detects pairs of areas having the highest degree of similarity. Then, at Step S54, based on the pairs of areas detected at Step S53, the associating unit 321b decides on the background objects with respect to the target object.

The associating unit 321b can obtain the degree of similarity between the feature quantities using the L1 norm between the feature quantities or the Bhattacharyya distance between the feature quantities. Alternatively, the associating unit 321b can associate images based on the output result that is identified by a classifier, such as an SVM, after the two feature quantities to be compared are integrated into a single feature quantity. The associating unit 321b compares the degree of similarity of each combination of a background object area detected from the area 100 and a background object area detected from the common-range taken image 40'; obtains the pairs of areas having the highest degree of similarity or obtains the pairs of areas having the degree of similarity to be equal to or greater than a threshold value; and decides on the background objects with respect to the target object.

In the third embodiment, as a result of detecting the background objects with respect to the target object using the color information, the edge information, and the feature quantity; the positions and the areas of images of the background objects can be obtained with more precision, thereby enabling clipping of the detection rectangle image with more accuracy.

Fourth Embodiment

Given below is the explanation of a fourth embodiment. In the image processing system according to the first to third embodiments, the driving support device 30 mounted on the target vehicle 20 receives taken images and position information from the imaging device 31, which is mounted on the other vehicle 21, and from the imaging device 32, which is mounted on a fixed object (the traffic light 11), in a direct manner using wireless communication. In contrast, in the fourth embodiment, the driving support device 30 receives taken images and position information from the imaging devices 31 and 32 via a server device.

Figure 24:
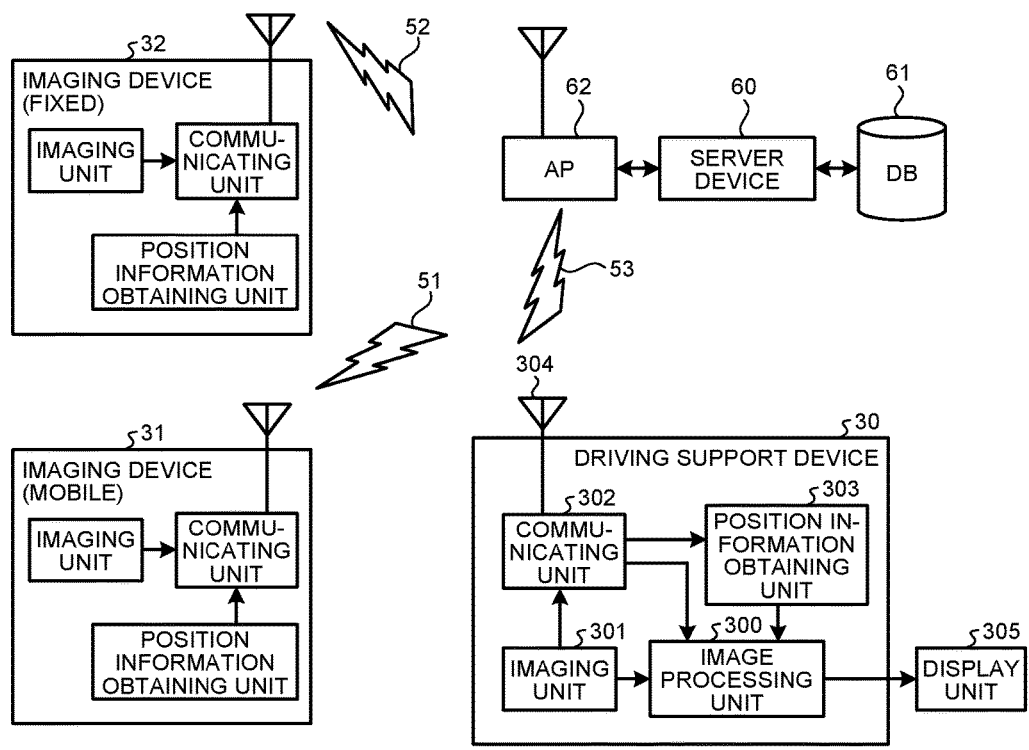
FIG. 24 is a block diagram that schematically illustrates an exemplary configuration of an image processing system according to a fourth embodiment.

In FIG. 24 is schematically illustrated an exemplary configuration of an image processing system according to the fourth embodiment. With reference to FIG. 24, the portions common with FIG. 2 are referred to by the same reference numerals, and the detailed explanation thereof is not repeated. With reference to FIG. 24, in the image processing system, a server device 60, a database (DB) 61, and an access point (AP) 62 are added to the configuration illustrated in FIG. 2. The communicating unit 302 of the driving support device 30 and the communicating units of the imaging devices 31 and 32 search for the AP 62 and, when the AP 62 is found, establish communication with the AP 62.

For example, the imaging device 31 sends, to the AP 62, a taken image that is taken by the imaging unit; position information indicating the imaging position as obtained by the position information obtaining unit; and time information indicating the time of imaging. The AP 62 receives the taken image, the position information, and the time information sent from the imaging device 31; and sends the received information to the server device 60. Then, the server device 60 stores the taken image in the DB 61 in association with the position information and the time information.

The operations of the imaging device 32 are substantially identical to the operations of the imaging device 31. Hence, the explanation is not repeated herein. Meanwhile, the imaging device 32 that is mounted on a fixed object can be connected to the server device 60 in a wired manner too.

The driving support device 30 performs communication with the AP 62 using the communicating unit 302, and requests the server device 60 for the taken images that are taken by the imaging devices 31 and 32 as well as for the position information and the time information indicating the imaging positions and the imaging time of the taken images. At that time, the driving support device 30 adds, to the request issued to the server device 60, the position information indicating the current position as obtained by the position information obtaining unit 303 and the time information indicating the current time. Moreover, for example, according to the timing of issuing the request to the server device 60, the driving support device 30 performs imaging using the imaging unit 301 and obtains a taken image, as well as obtains the position information indicating the current position using the position information obtaining unit 303.

The AP 62 receives the request issued by the driving support device 30, receives the position information and the time information added to the request, and sends the received request and a variety of information to the server device 60. Then, according to the received request, the server device 60 searches the taken images in the DB 61 based on the position information and the time information. For example, the server device 60 searches the taken images stored in the DB 61 for the position information and time information that is within a predetermined range with respect to the position information and the time information received along with the request from the driving support device 30.

As the search result, the server device 60 obtains the taken image corresponding to the position information and the time information retrieved from the DB 61, and obtains the position information corresponding to the concerned taken image. Then, the server device 60 sends the taken image and the position information to the driving support device 30 from the AP 62 using wireless communication 53. Thus, the driving support device 30 receives the taken image and the position information sent from the AP 62. Then, using the received taken image and the received position information and using the taken image and the position information obtained by the imaging unit 301 and the position information obtaining unit 303, respectively, according to the timing of issuing the request to the server device 60; the driving support device 30 performs operations explained in the first to third embodiments and obtains the detection rectangle image 3061 and the target vehicle surroundings image 3062.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
hardware circuitry configured to:
obtain first images capturing a street, on which a target vehicle is running, from a plurality of directions, and position information indicating imaging positions at which the first images are taken;
detect a target object from the first images;
associate an image of a background object included in a second image with an image of the background object included in a third image, the first images including the second image and the third image, the second image being an image from which the target object is detected, the third image being an image which is taken by an imaging device having a common imaging range with the second image among imaging devices installed on the target vehicle;
clip, from the second image, an image of a detection rectangle which includes the target object and the background object; and
generate an output image including the position information indicating a position at which the second image is taken, the image of the detection rectangle, and one of the first images.

2. The device according to claim 1, wherein the detection rectangle is certain percentage of a smallest rectangle including the target object entirely and the background object.

3. The image processing device according to claim 1, wherein the hardware circuitry is configured to divide a certain area around the target object in the second image as well as divide the third image using at least either color information or edge information, wherein the hardware circuitry is configured to associate, using at least either color information, or texture information, or area size, areas formed by the dividing of the second image with areas formed by the dividing of the third image, and set an area among mutually-associated areas which has a highest degree of similarity as a background object area.

4. The image processing device according to claim 1, wherein the hardware circuitry is configured to detect an image of the background object from a certain area around the detected target in the second image, wherein
the hardware circuitry is configured to search the third image for the image of the background object, and set an area in the third image which has a highest degree of similarity with the detected image of the background object as a background object area.

5. The image processing device according to claim 1, wherein the hardware circuitry is configured to detect an image of the background object and attribute information of the background object from a certain area around the target object in the second image as well as from the third image, wherein the hardware circuitry is configured to associate images of the background object, which are detected from the second image and the third image, using at least one of color information, texture information, and the attribute information, and set a detection rectangle of the associated images of the background object as a background object area.

6. The image processing device according to claim 1, wherein the hardware circuitry is configured to obtain the first images obtained by an imaging device mounted in a vicinity of the street on which the target vehicle is running and obtained by imaging devices mounted on mobile objects including the running target vehicle, and obtain the position information indicating imaging positions of the first images.

7. The image processing device according to claim 1, wherein, when the hardware circuitry associates a single background object captured within a certain area around the target object and when height and width of a smallest rectangle including an image of the background object associated is smaller than a certain percentage of height and width of the target object, the hardware circuitry is configured to clip a rectangle including the smallest rectangle entirely and the target object entirely as the detection rectangle from the second image.

8. The image processing device according to claim 1, wherein, when the hardware circuitry associates a single background object captured within a certain area around the target object and when height and width of a smallest rectangle including an image of the background object associated is greater than a certain percentage of height and width of the target object, the hardware circuitry is configured to determine whether or not the image of the background object associated represents an image of an object present on road surface, and the hardware circuitry is configured to, when the image of the background object associated is determined to represent an image of an object present on road surface, clip a rectangle including an area formed by expansion in horizontal direction of the smallest rectangle, which includes the image of the background object, in a certain percentage from one side of the smallest rectangle that is close in horizontal direction to an in-image position of the target object toward a direction from the smallest rectangle to the target object, and the target object entirely, as the detection rectangle from the second image.

9. The image processing device according to claim 1, wherein, when the hardware circuitry associates a single background object captured within a certain area around the target object and when height and width of a smallest rectangle including an image of the background object associated is greater than a certain percentage of height and width of the target object, the hardware circuitry is configured to determine whether or not the image of the background object associated represents an image of an object present on road surface, and the hardware circuitry is configured to, when the image of the background object associated is determined not to represent an image of an object present on road surface, clip a rectangle including an area formed by expansion in vertical direction of the smallest rectangle, which includes the image of the background object, in a certain percentage from one side of the smallest rectangle that is close in vertical direction to an in-image position of the target object toward a direction from the smallest rectangle to the target object, and the target object entirely, as the detection rectangle from the second image.

10. The image processing device according to claim 7, wherein, when the hardware circuitry associates a plurality of background objects captured within a certain area around the target object, the hardware circuitry is configured to identify, as a single background object, an image of a background object closest to the target object from among the associated images of a plurality of the background objects.

11. The image processing device according to claim 8, wherein, when the hardware circuitry associates a plurality of background objects captured within a certain area around the target object, the hardware circuitry is configured to identify, as a single background object, an image of a background object closest to the target object from among the associated images of a plurality of the background objects.

12. The image processing device according to claim 9, wherein, when the hardware circuitry associates a plurality of background objects captured within a certain area around the target object, the hardware circuitry is configured to identify, as a single background object, an image of background object closest to the target object from among the associated images of a plurality of the background objects.

13. The image processing device according to claim 1, wherein the hardware circuitry is configured to perform wireless communication, and the hardware circuitry is configured to obtain the first images and the position information using wireless communication.

14. The image processing device according to claim 13, wherein, the hardware circuitry is configured to:

obtain first ones of the first images formed by imaging performed by an imaging device which is mounted on the target vehicle and obtain the position information corresponding to the first ones of the first images, obtain second ones of the first images formed by imaging performed by an imaging device which is mounted in a surrounding environment of the target vehicle and obtain the position information corresponding to the second ones of the first images using wireless communication, and obtain third ones of the first images formed by imaging by an imaging device which is mounted on a vehicle different from the target vehicle and obtain the position information corresponding to the third ones of the first images using wireless communication.

15. The image processing device according to claim 13, wherein the hardware circuitry is configured to perform wireless communication with a server device, obtain first ones of the first images formed by imaging performed by an imaging device which is mounted on the target vehicle and obtain the position information corresponding to the first ones of the first images, and obtain second ones of the first images and the position information corresponding to the second ones of the first images from the server device using wireless communication.

16. An image processing system comprising:

the image processing device according to claim 13;

a first communication device; and a second communication device, wherein the first communication device is configured to send first ones of the first images taken by an imaging device installed around a street and send the position information corresponding to the first ones of the first images, the second communication device is configured to send second ones of the first images taken by an imaging device mounted on a vehicle different from the target vehicle and send the position information corresponding to the second ones of the first images, and the hardware circuitry is configured to;

obtain third ones of the first images formed by imaging performed an imaging device mounted on the target vehicle and obtain the position information corresponding to the first images, and obtain, via wireless communication, first images and position information sent by at least one of the first communication device and the second communication device.

17. An image processing system comprising:

the image processing device according to claim 13;

a first communication device;

a second communication device; and a server device, wherein the first communication device is configured to send first ones of the first images taken by an imaging device installed around the street and send the position information corresponding to the first ones of the first images, the second communication device is configured to send second ones of ends the first images taken by an imaging device mounted on a vehicle different from the target vehicle and send the position information corresponding to the second ones of the first images, the server device is configured to obtain first images and tie-position information sent by the first communication device as well as the second communication device, and the hardware circuitry is configured to;

obtain third ones of the first images formed by imaging performed an imaging device mounted on the target vehicle and obtain the position information corresponding to the third ones of the first images, and obtain, from the server device via the wireless communication, first images and position information sent by at least one of the first communication device and the second communication device.

18. An image processing method comprising:

obtaining first images capturing a street, on which a target vehicle is running, from a plurality of directions, and position information indicating imaging positions at which the first images are taken;

detecting a target object from the first images;

associating an image of a background object included in a second image with an image of the background object included in a third image, the first images including the second image and the third image, the second image being an image from which the target object is detected, the third image being an image which is taken by an imaging device having a common imaging range with the second image among imaging devices installed on the target vehicle;

clipping, from the second image, an image of a detection rectangle which includes the target object and the background object; and generating an output image including the position information indicating a position at which the second image is taken, the image of the detection rectangle, and one of the first images.

* * * * *